US012174905B2

(12) United States Patent
Toth

(10) Patent No.: US 12,174,905 B2
(45) Date of Patent: Dec. 24, 2024

(54) SYSTEMS, DEVICES, AND METHODS FOR SEARCH ENGINE OPTIMIZATION

(71) Applicant: GSCORE Inc., Toronto (CA)

(72) Inventor: Steve Marton Toth, Toronto (CA)

( * ) Notice: Subject to any disclaimer, the term of this patent is extended or adjusted under 35 U.S.C. 154(b) by 106 days.

(21) Appl. No.: 17/983,598

(22) Filed: Nov. 9, 2022

(65) Prior Publication Data

US 2023/0146998 A1    May 11, 2023

Related U.S. Application Data

(60) Provisional application No. 63/277,271, filed on Nov. 9, 2021.

(51) Int. Cl.
*G06F 17/00* (2019.01)
*G06F 16/958* (2019.01)
*G06F 40/40* (2020.01)

(52) U.S. Cl.
CPC ............ *G06F 16/958* (2019.01); *G06F 40/40* (2020.01)

(58) Field of Classification Search
CPC ....... G06F 16/958; G06F 40/40; G06F 40/279
See application file for complete search history.

(56) References Cited

U.S. PATENT DOCUMENTS

| 8,868,570 | B1 * | 10/2014 | Skut | G06F 16/951 |
| | | | | 706/45 |
| 9,922,361 | B2 * | 3/2018 | Bax | G06F 16/9535 |
| 10,277,692 | B2 * | 4/2019 | Naveh | H04L 67/306 |
| 11,640,447 | B1 * | 5/2023 | Stone | G06F 18/24 |
| | | | | 706/62 |
| 2006/0026147 | A1 * | 2/2006 | Cone | G06F 16/9535 |
| 2007/0288454 | A1 * | 12/2007 | Bolivar | G06Q 30/02 |
| | | | | 707/999.005 |

(Continued)

OTHER PUBLICATIONS

"SERP API," Web page <https://dataforseo.com/apis/serp-api >, 29 pages, retrieved from Internet Archive Wayback Machine <https://web.archive.org/web/20221001051847/https://dataforseo.com/apis/serp-api> on Feb. 9, 2023.

(Continued)

*Primary Examiner* — Laurie A Ries
(74) *Attorney, Agent, or Firm* — HEER LAW; Christopher D. Heer

(57) ABSTRACT

A computer-implemented method and system for search engine optimization, comprising: determining at least one keyword for which a webpage is ranked by a search engine; determining if at least one missing keyword exists by comparing to webpage content; determining a webpage score based on a cost per click of each missing keyword and an impression count for each missing keyword; and either or both: displaying at least one user interface component representing the webpage score and, if at least one missing keyword exists, at least one missing keyword; and updating the webpage content based on at least one missing keyword. A computer-implemented method, comprising: receiving search result data retrieved based on at least one keyword; generating at least one natural language processing entity based on the search result data; and displaying a user interface component representing the at least one natural language processing entity as at least one suggested keyword.

20 Claims, 32 Drawing Sheets

(56) References Cited

U.S. PATENT DOCUMENTS

| | | | |
|---|---|---|---|
| 2007/0288514 A1* | 12/2007 | Reitter | G06F 16/903 707/E17.135 |
| 2009/0292677 A1* | 11/2009 | Kim | G06F 16/958 |
| 2012/0288203 A1* | 11/2012 | Pan | G06F 16/5846 382/190 |
| 2012/0323905 A1* | 12/2012 | Qiao | G06F 16/9535 707/723 |
| 2013/0311271 A1* | 11/2013 | Agrawal | G06Q 30/02 705/14.71 |
| 2014/0025480 A1* | 1/2014 | Carter | G06Q 30/0246 705/14.43 |
| 2014/0040238 A1* | 2/2014 | Scott | G06F 16/332 707/769 |
| 2014/0095427 A1* | 4/2014 | Fox | G06F 16/245 707/603 |
| 2014/0164350 A1* | 6/2014 | Landa | H04L 67/535 707/709 |
| 2016/0085758 A1* | 3/2016 | Mahmud | G06F 16/335 707/733 |
| 2016/0125087 A1* | 5/2016 | Mallah | G06F 16/9535 705/14.54 |
| 2016/0179879 A1* | 6/2016 | van Zwol | G06Q 30/0256 705/14.54 |
| 2017/0228462 A1* | 8/2017 | Zhu | G06F 16/954 |
| 2019/0073365 A1* | 3/2019 | Jamshidi | G06F 16/986 |

OTHER PUBLICATIONS

"Google Cloud Natural Language AI," Web page <https://cloud.google.com/natural-language>, 9 pages, retrieved from Internet Archive Wayback Machine <https://web.archive.org/web/20221108042729/https://cloud.google.com/natural-language/> on Feb. 9, 2023.

* cited by examiner

SYSTEMS, DEVICES, AND METHODS FOR SEARCH ENGINE OPTIMIZATION

FIELD

The specification generally relates to search engines and, in particular, to search engine optimization.

BACKGROUND

Search engines can be used to search for websites in response to a query provided by a user.

If a website is highly ranked in a result returned by a search engine, this can facilitate increased engagement with the website. As users may not choose to engage with subsequent pages returned by a search engine, if the website is ranked lower in the search results, there can be decreased engagement with the website.

SUMMARY

In accordance with an aspect, there is provided a computer-implemented method for search engine optimization, including: determining at least one keyword for which a webpage is ranked by a search engine; determining if at least one missing keyword exists by comparing the at least one keyword to content of the webpage; determining a webpage score based on a cost per click of each missing keyword and an impression count for each missing keyword; and either or both: displaying at least one user interface component representing: the webpage score; or the webpage score and, if at least one missing keyword exists, at least one missing keyword; and updating the content of the webpage based on at least one missing keyword.

In some embodiments, the webpage is ranked above a threshold.

In some embodiments, the webpage score is a sum of, for each missing keyword, the cost per click multiplied by the impression count.

In some embodiments, the updating includes adding at least one missing keyword to the content of the webpage.

In some embodiments, the method further includes receiving an update to the content of the webpage; updating the webpage score based on the update; and displaying at least one user interface component representing the webpage score.

In some embodiments, the webpage score is updated based on the cost per click of each missing keyword and the impression count for each missing keyword, except of any included keyword included in the content after the update.

In some embodiments, further including displaying a dashboard interface component representing at least one webpage and each webpage score for each webpage.

In some embodiments, the method further includes: receiving at least one proposed keyword; receiving search result data retrieved based on the at least one proposed keyword; generating at least one natural language processing entity based on the search result data; and displaying a suggestions user interface component representing the at least one natural language processing entity as at least one suggested keyword.

In accordance with an aspect, a computer-implemented method for search engine optimization, includes: receiving at least one keyword; receiving search result data retrieved based on the at least one keyword; generating at least one natural language processing entity based on the search result data; and displaying a user interface component representing the at least one natural language processing entity as at least one suggested keyword.

In some embodiments, the search result data includes result metadata and at least one result reference.

In some embodiments, the search result data includes dynamic metadata.

In some embodiments, the method further includes determining a metadata difference by comparing dynamic metadata to webpage metadata, the search result data comprising the metadata difference.

In accordance with an aspect, there is provided a non-transitory computer-readable medium storing computer-readable instructions which, when executed by a computer processor, cause the processor to perform a method including: determining at least one keyword for which a webpage is ranked by a search engine; determining if at least one missing keyword exists by comparing the at least one keyword to content of the webpage; determining a webpage score based on a cost per click of each missing keyword and an impression count for each missing keyword; and either or both: displaying at least one user interface component representing:
  the webpage score; or the webpage score and, if at least one missing keyword exists, at least one missing keyword; and updating the content of the webpage based on at least one missing keyword.

In some embodiments, the webpage is ranked above a threshold.

In some embodiments, the webpage score is a sum of, for each missing keyword, the cost per click multiplied by the impression count.

In some embodiments, the updating comprises adding at least one missing keyword to the content of the webpage.

In some embodiments, the method further includes receiving an update to the content of the webpage; updating the webpage score based on the update; and displaying at least one user interface component representing the webpage score.

In some embodiments, the webpage score is updated based on the cost per click of each missing keyword and the impression count for each missing keyword, except of any included keyword included in the content after the update.

In some embodiments, the method further includes displaying a dashboard interface component representing at least one webpage and each webpage score for each webpage.

In some embodiments, the method further includes: receiving at least one proposed keyword; receiving search result data retrieved based on the at least one proposed keyword; generating at least one natural language processing entity based on the search result data; and displaying a suggestions user interface component representing the at least one natural language processing entity as at least one suggested keyword.

In some embodiments, there is provided a computer-implemented system and method for optimizing search engine results. The method includes connecting to the Google Search Console API, retrieving and downloading keywords the page is ranking, searching a page's content to determine if the keywords are present, connecting to the Keywords Everywhere API, retrieving the cost per click value of the keywords, retrieving impression count for keywords from Google Search Console, multiplying the impression count by the cost pet click of the keywords, and multiplying the total cost per clicks by the impression count for missing keywords to determine the webpage score for a page. The method further includes determining if keywords exist on a webpage's content. The computer system displays keywords that do not exist in a webpage's content in a text editor in a sidebar on the right-hand side of a page to allow a user to add the missing keywords to their webpage. The system may run as a WordPress plug-in or as a standalone Software as a Service application.

In some embodiments, there is provided a computer-implemented system for generating missing entities for a keyword. The system comprising connecting to a SERP API to scrape search engine results for given keywords; copying text from the search results; and processing the copied text through Google Natural Language API. The system may visit a webpage to download its meta data and compare the data with the meta data Google chooses to display. The system will process the data not shown by Google through the Google Natural Language API. The entities are stored to be used as suggested keywords for optimizing content.

Other aspects and features and combinations thereof concerning embodiments described herein will become apparent to those ordinarily skilled in the art upon review of the instant disclosure of embodiments in conjunction with the accompanying figures.

BRIEF DESCRIPTION OF THE DRAWINGS

The principles of the invention may better be understood with reference to the accompanying figures provided by way of illustration of an exemplary embodiment, or embodiments, incorporating principles and aspects of the present invention, and in which:

FIG. 18 is a screenshot of a search engine optimization system showing webpage content with a sidebar listing keywords included in the content, according to some embodiments;

Figure 30:
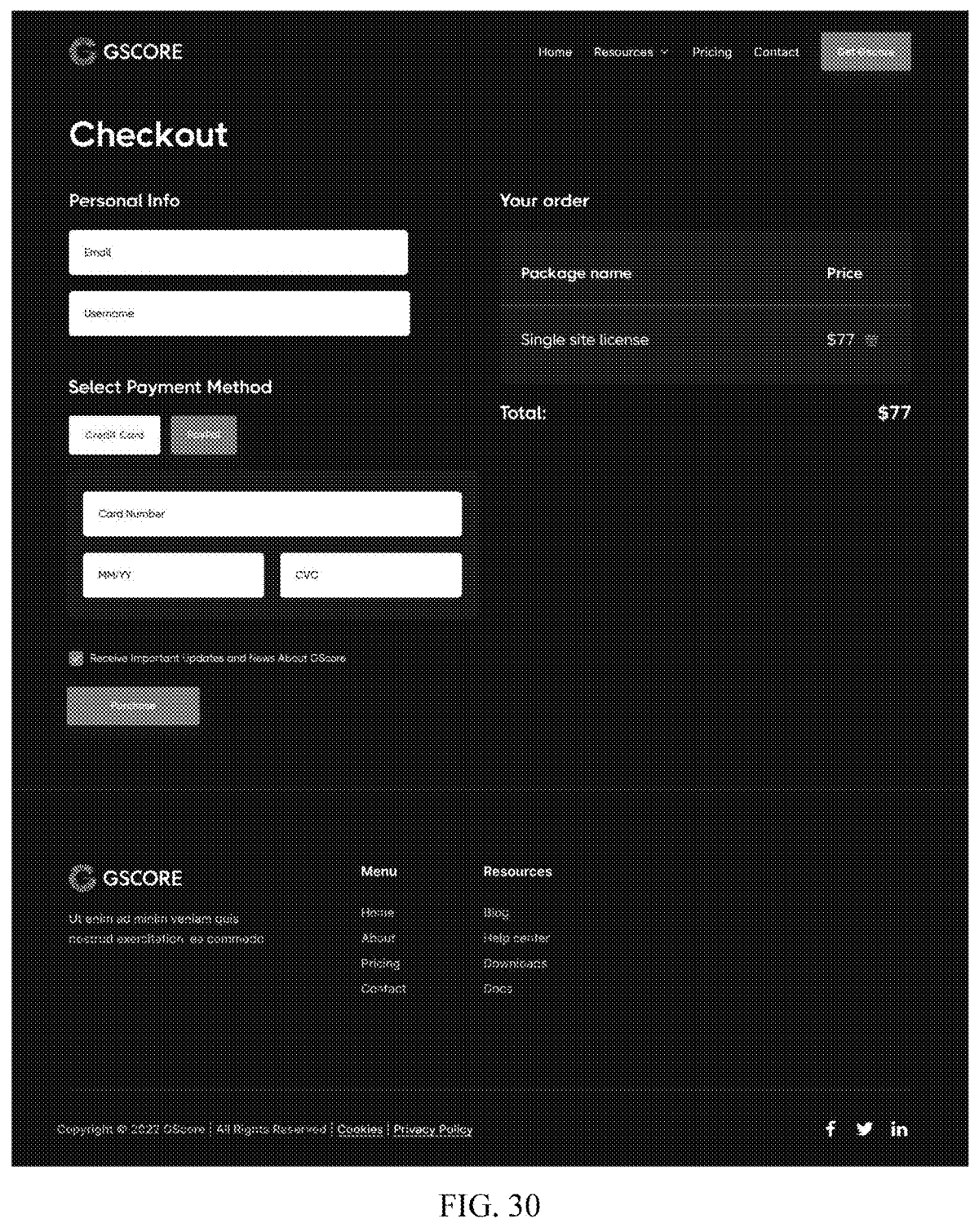

FIG. 30 is a screenshot of an application, according to some embodiments;

DETAILED DESCRIPTION OF EMBODIMENTS

Figure 1:
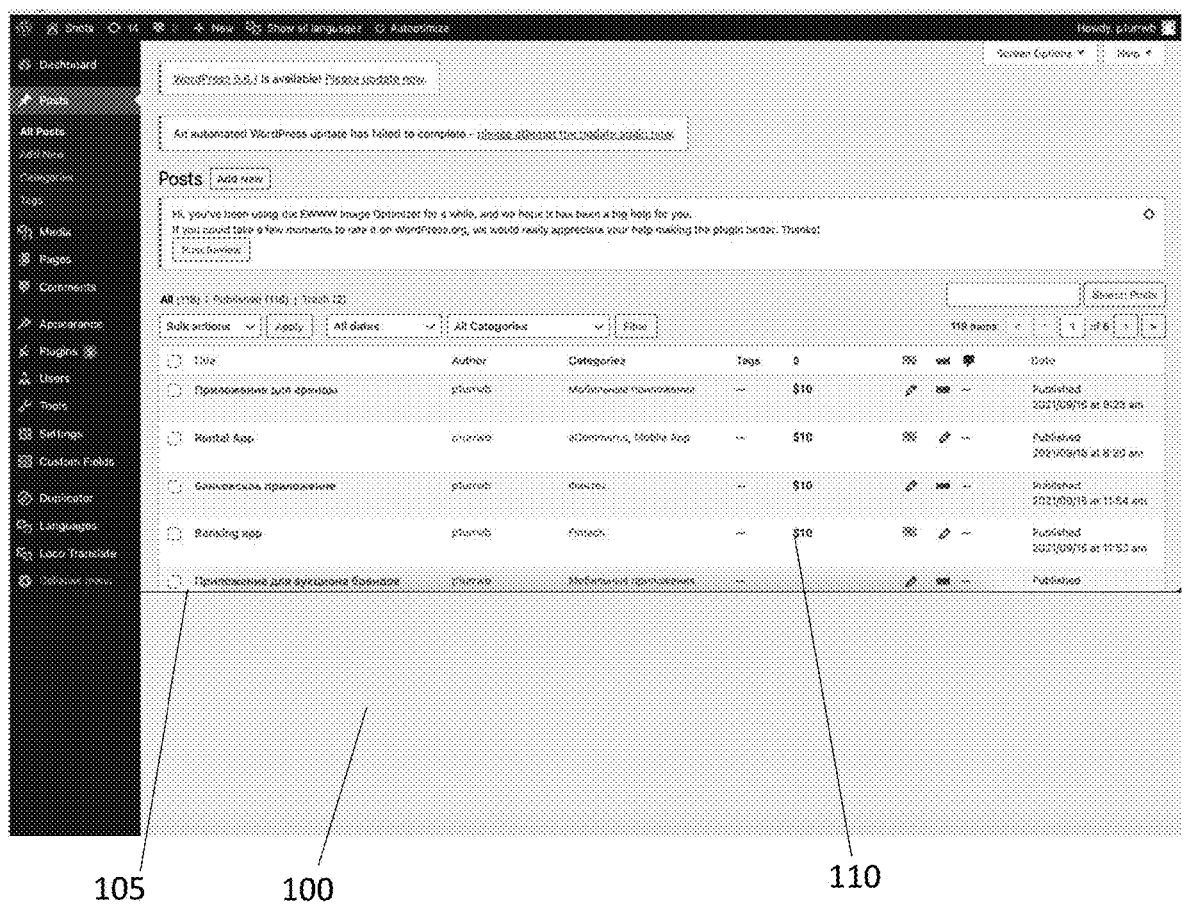
FIG. 1 is a screenshot of a dashboard of a search engine optimization system displaying all of a user's webpages and respective webpage scores, according to some embodiments.

The description that follows, and the embodiments described therein, are provided by way of illustration of an example, or examples, of particular embodiments. These examples are provided for the purposes of explanation, and not of limitation. In the description, like parts are marked throughout the specification and the drawings with the same respective reference numerals. The drawings are not necessarily to scale and in some instances proportions may have been exaggerated in order more clearly to depict certain features.

According to some embodiments, search engine optimization system implements an application including functionality to optimize results in a search engine. The application, such as at score generator of search engine optimization system, connects to Google's Search Console Application Programming Interface ("API") and retrieves the rankings for a search results page's keywords. Users will be able to view all the keywords and their corresponding webpage scores in a content editor and add keywords to their webpage content through a sidebar containing all the keywords. By adding keywords with a larger webpage score value, they increase their ranking in a search engine result, reaching increased webpage views. In some embodiments, other APIs are used.

For a user to have increased ranking on Google search results and other search engines, the user can sign into Google Search Console API and activate their application subscription to access the API functionality to be able to download the keywords associated with their URL. The application will check the webpage to determine if the downloaded keywords are present on the URL's content or not. The application then connects to the Keywords Everywhere API to determine the keyword's the cost per click (CPC') value and retrieves the impressions count value for each keyword from Google Search Console API. The impression count value is the number of times a keyword is shown in search results. The CPC value is then multiplied by the impression count for each keyword to obtain the webpage score value. The total value of CPC multiplied by impression count for all missing keywords is calculated to get the total webpage score value for the webpage. After calculating the webpage score values, the data will be displayed in the application for the user to select keywords from a sidebar located on the right-hand side to add to their webpage. When new keywords are added, they are counted in the total and the webpage's webpage score is recalculated. The application operates as a WordPress plug-in and includes a dashboard which displays a list of a user's webpages and their corresponding webpage score values. The application may include functionality to run as a standalone Software as a Service.

According to an embodiment as shown in FIG. 1, a computer-implemented system and method for optimizing search engine results includes a dashboard 100 to display a user's list of pages 105 and their corresponding webpage score values 110. Dashboard 100 allows for a user to keep track of their content and its ranking in case a user needs to update content and keywords to increase their contents ranking if it begins to drop.

Figure 2:
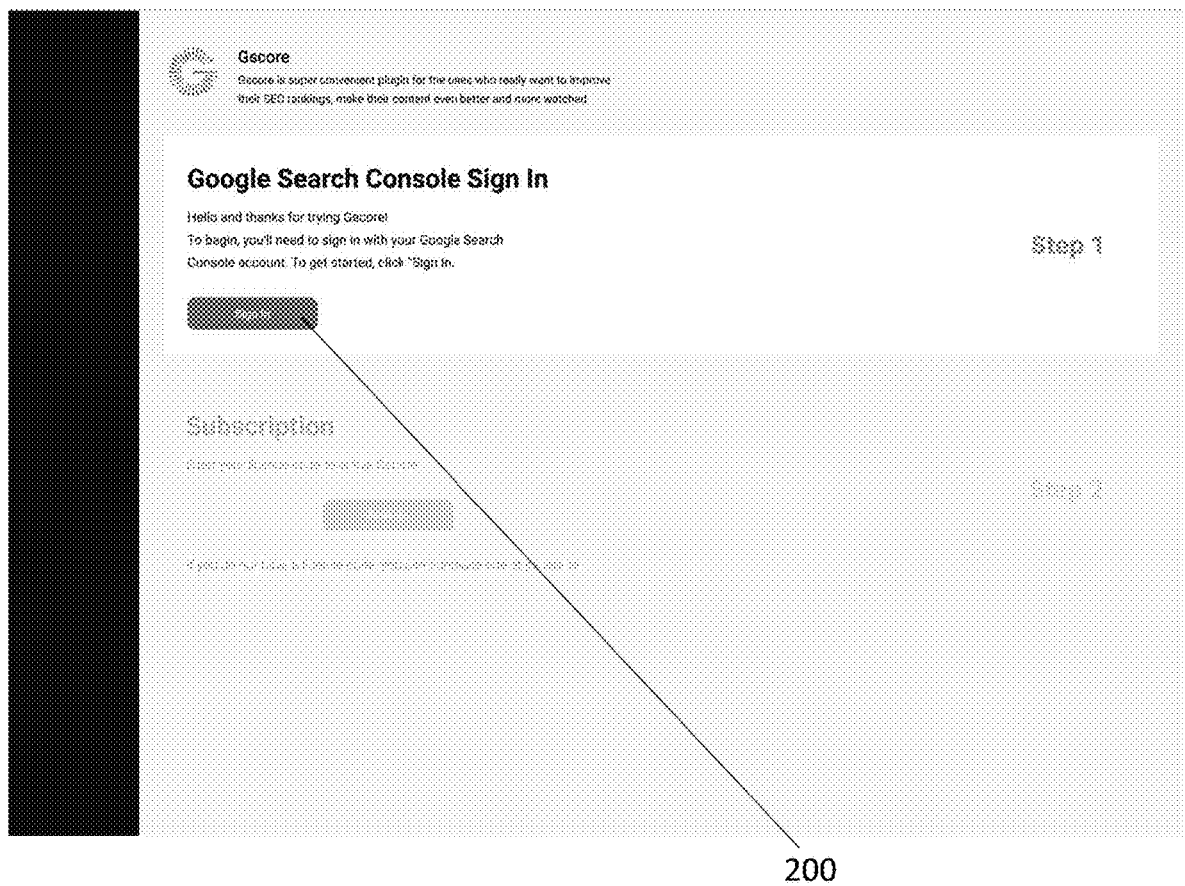
FIG. 2 is a screenshot of a search engine optimization system displaying a sign-in screen, according to some embodiments.
Figure 3:
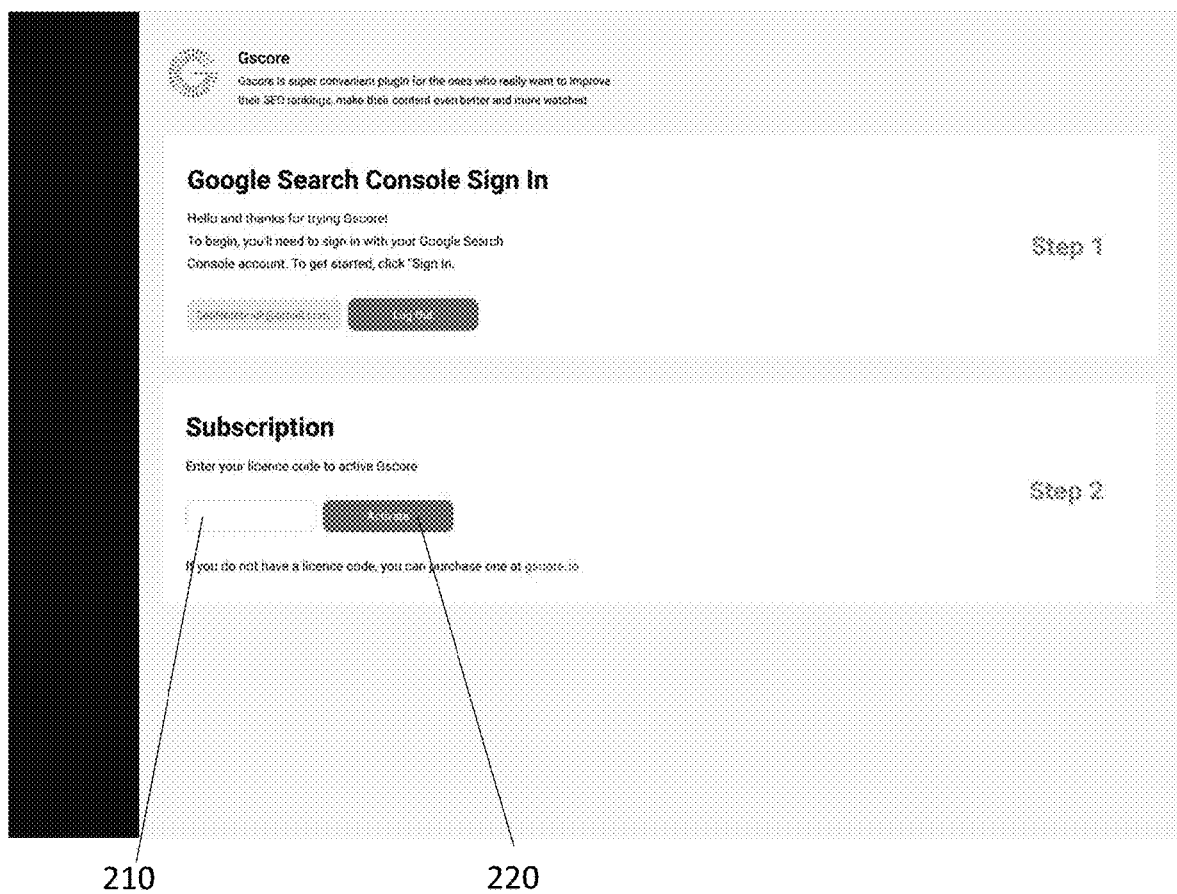
FIG. 3 is a screenshot of a search engine optimization system displaying a subscription activation interface component, according to some embodiments.
Figure 4:
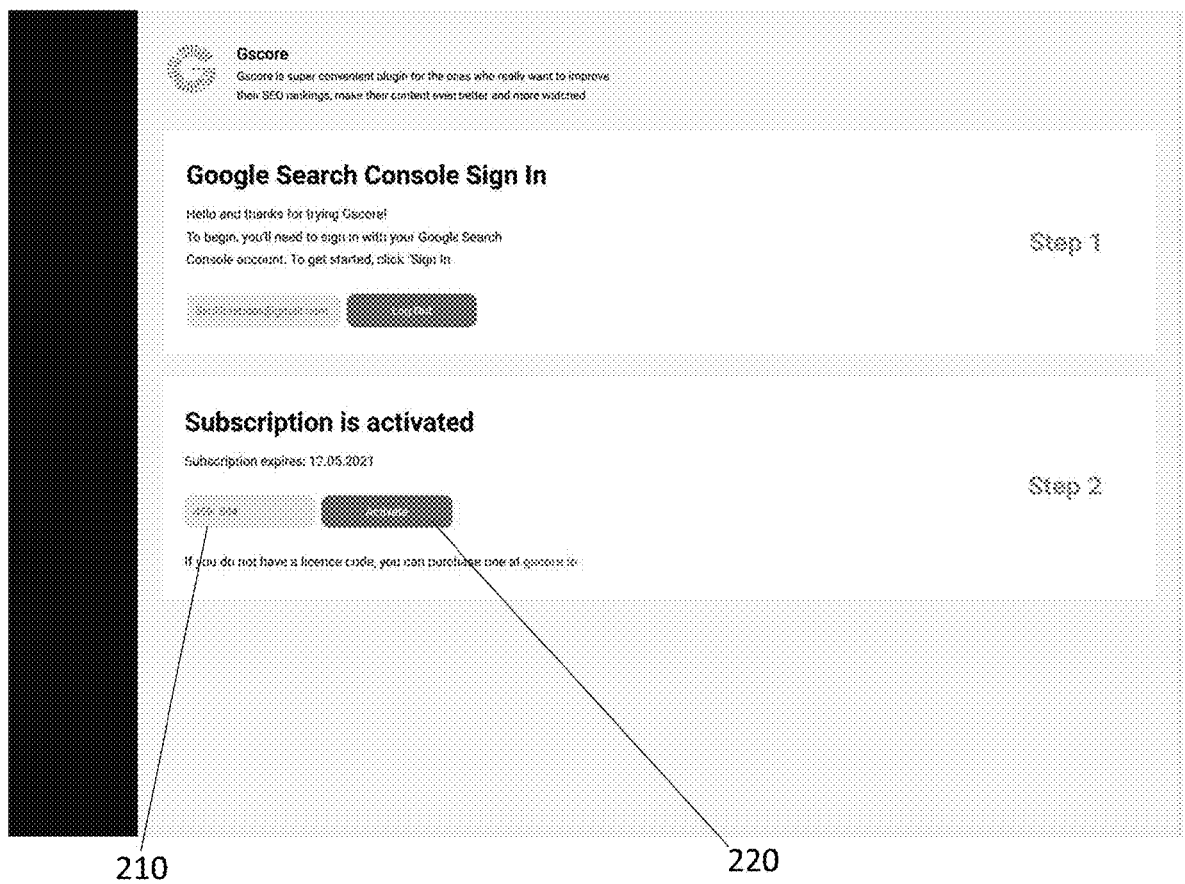
FIG. 4 is a screenshot of a search engine optimization system showing a sign-in screen after a user has activated a subscription, according to some embodiments.

According to an embodiment as shown in FIGS. 2 to 4, a user signs-in 200 to Google Search Console and activates 220 their subscription before they are able to use the software. After signing-in to Google Search Console, a user's activation code is entered into text box 210 to activate 220 their subscription. Once a valid activation code is entered, a user will be able to view when their subscription expires.

Figure 5:
FIG. 5 is a screenshot of a search engine optimization system showing a webpage with a webpage score sidebar before any keywords have been added, according to some embodiments.
Figure 6:
FIG. 6 is a screenshot of a search engine optimization system showing a webpage with a webpage score sidebar before a user has signed in or activated their license, according to some embodiments.
Figure 7:
FIG. 7 is a screenshot of a search engine optimization system showing a webpage score sidebar on a webpage before a webpage score has been generated, according to some embodiments.
Figure 8:
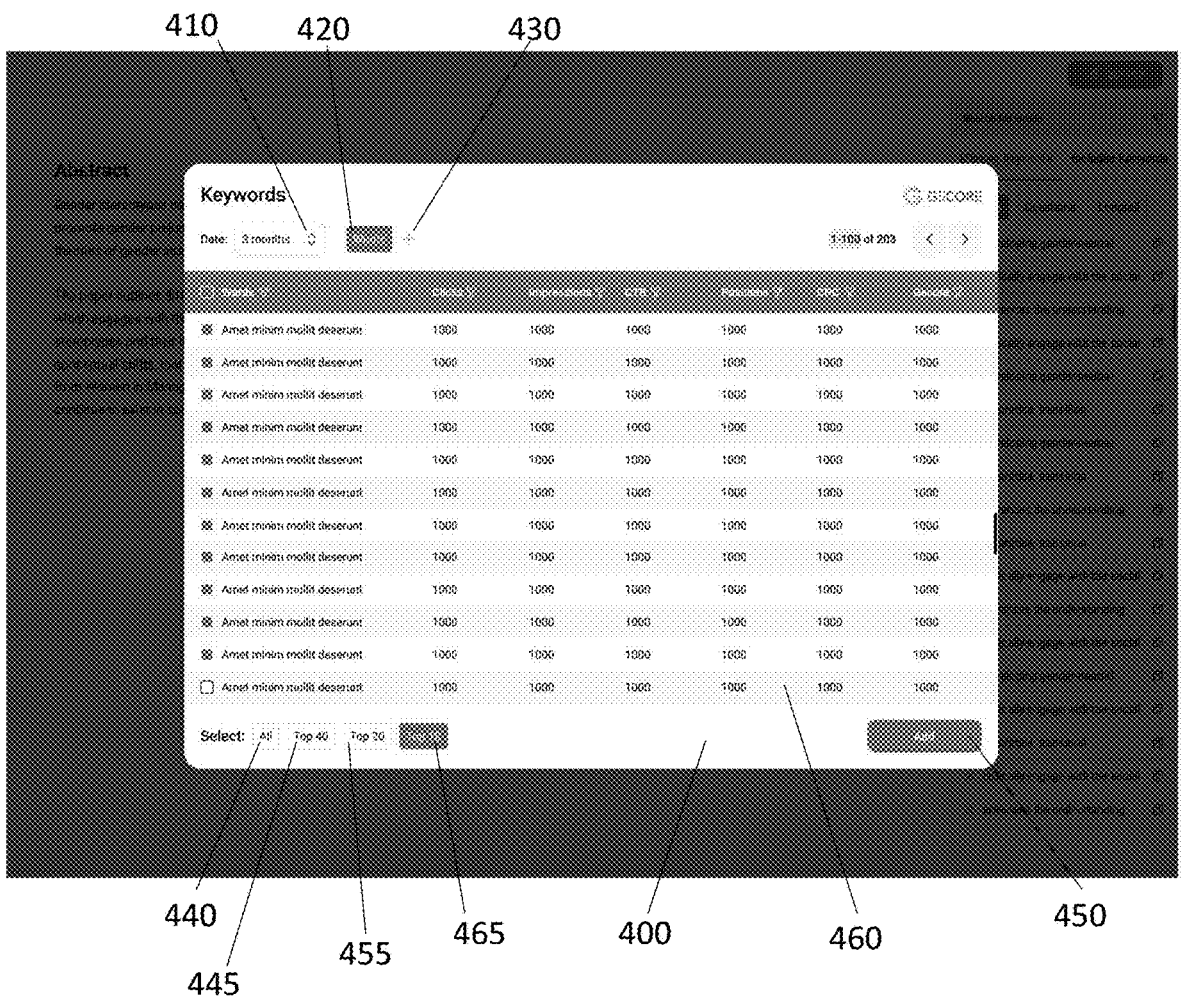
FIG. 8 is a screenshot of a search engine optimization system showing a list of missing keywords a user may add to content of a webpage, according to some embodiments.
Figure 9:
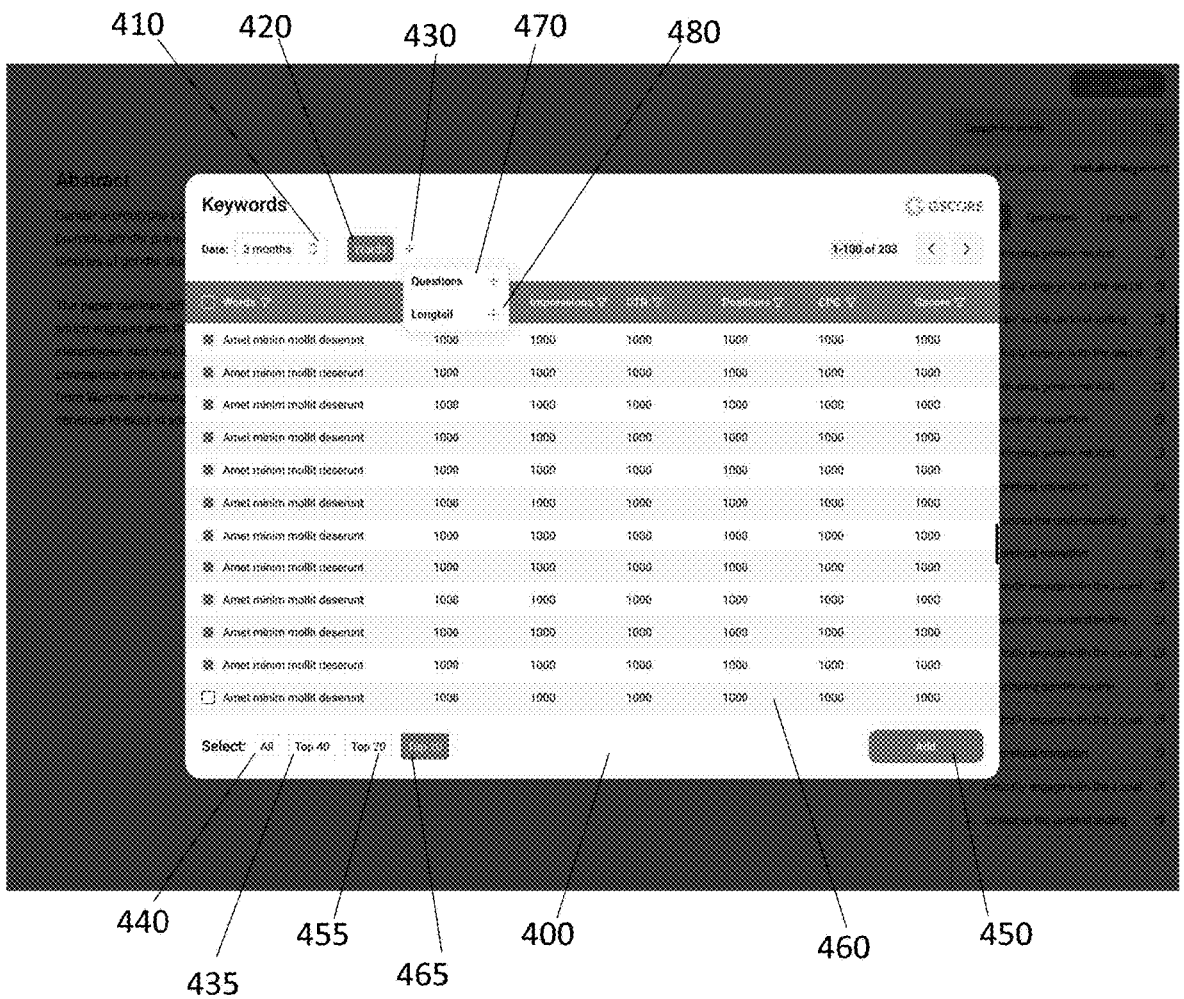
FIG. 9 is a screenshot of a search engine optimization system showing a list of keywords with a menu to add questions or longtail for sorting criteria, according to some embodiments.
Figure 10:
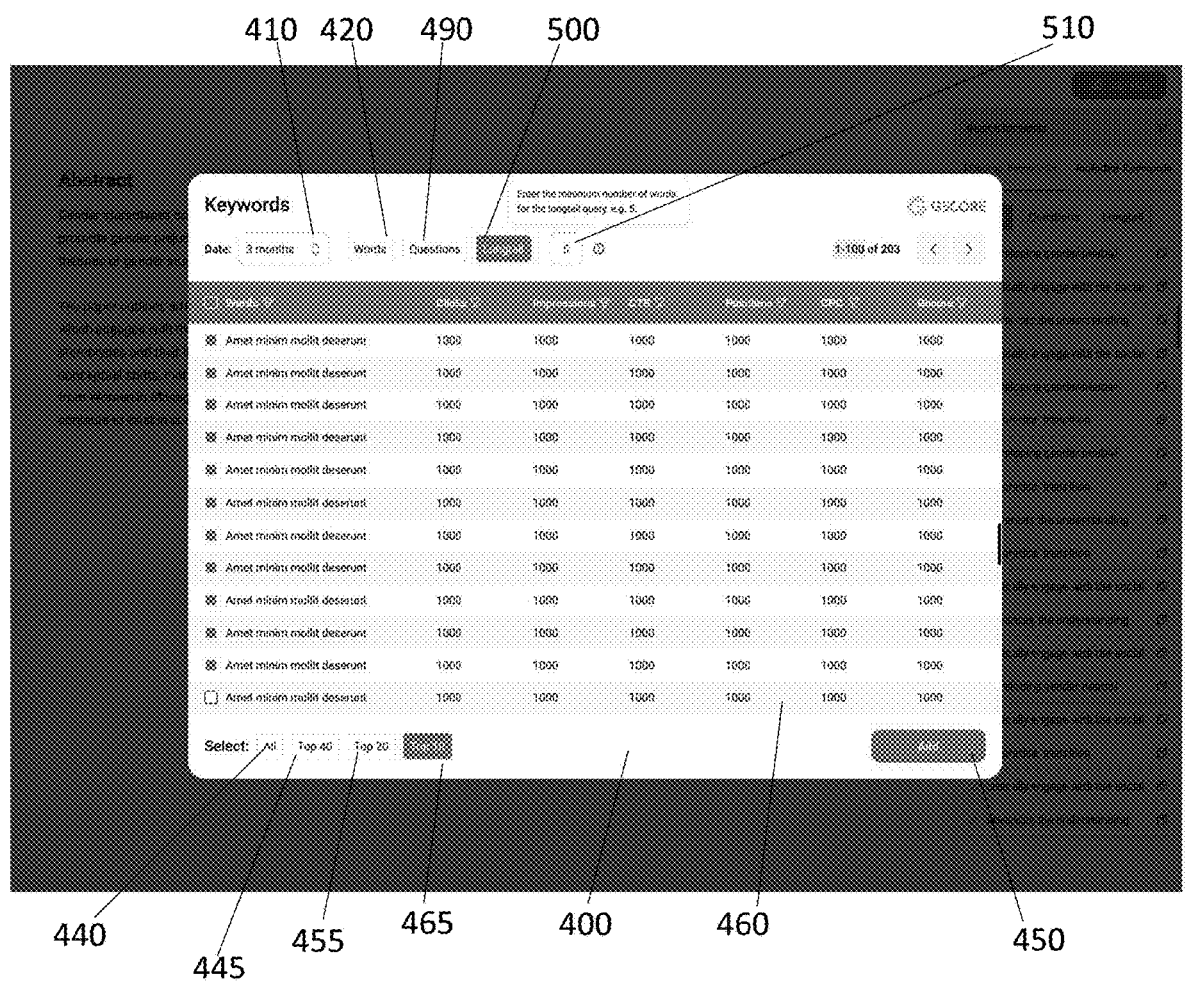
FIG. 10 is a screenshot of a search engine optimization system showing a list of keywords sorted by a longtail query, according to some embodiments.
Figure 11:
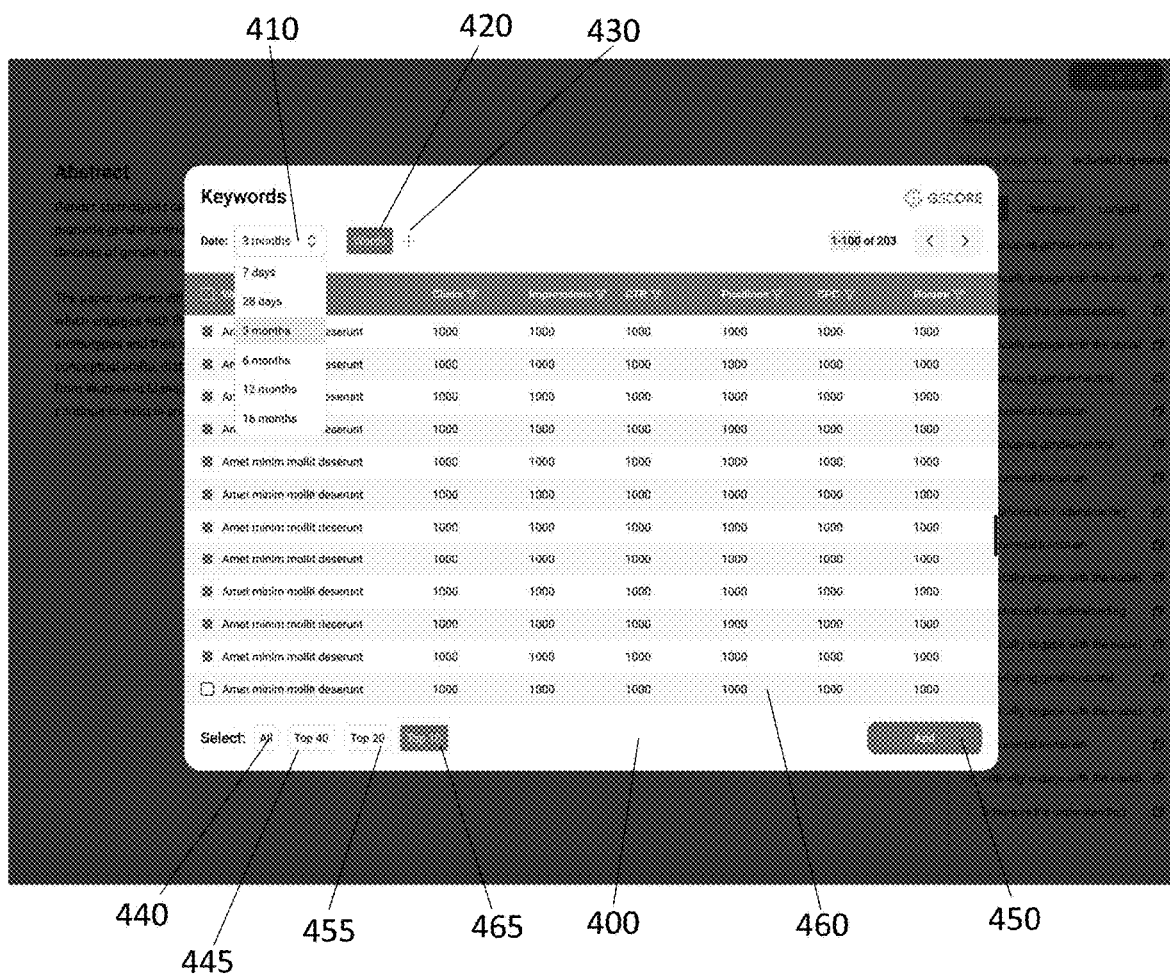
FIG. 11 is a screenshot of a search engine optimization system showing a drop-down menu for selecting the date range for the keyword results, according to some embodiments.
Figure 12:
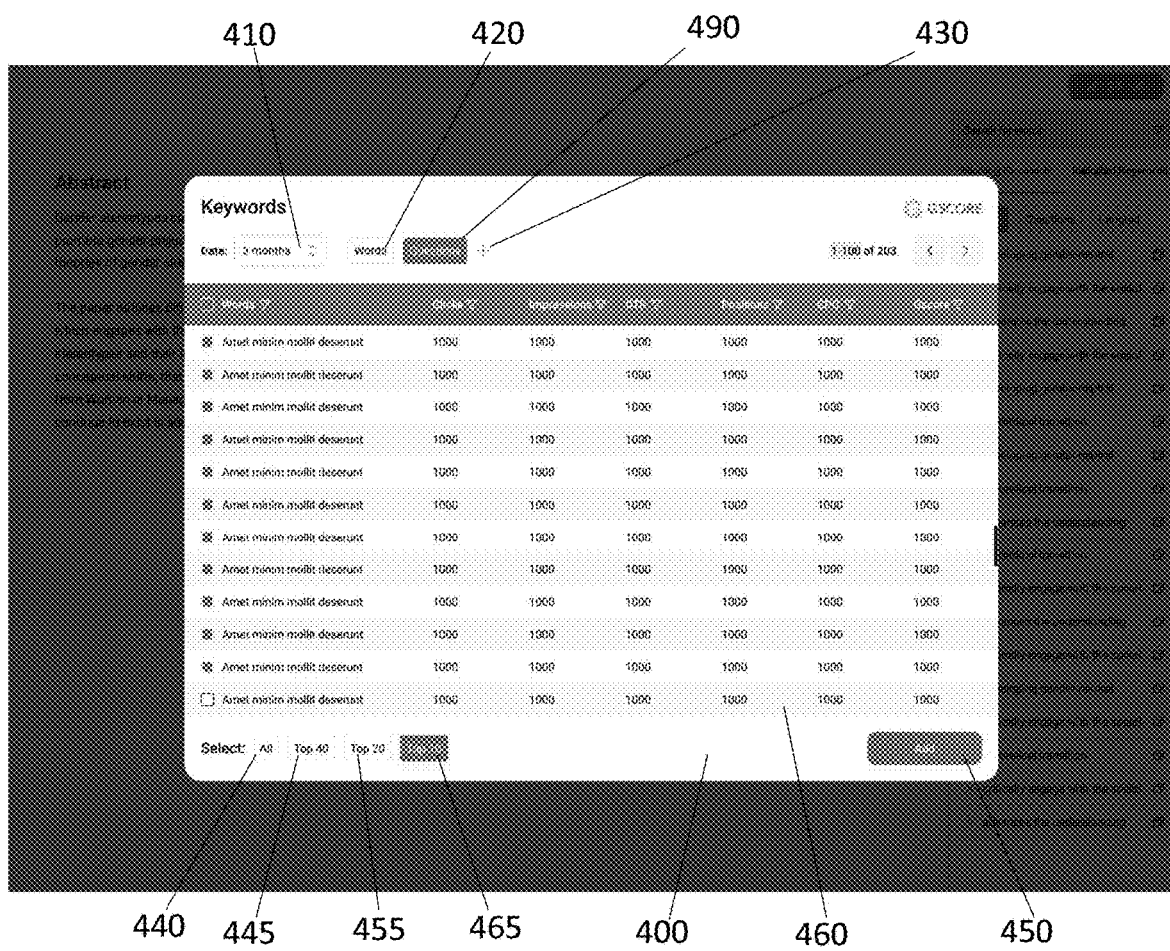
FIG. 12 is a screenshot of a search engine optimization system showing a ranked list of keywords sorted by a questions query, according to some embodiments.

According to an embodiment as shown in FIGS. 5 to 7, a sidebar 310 located on the right-hand side of webpage 300 includes a button to add keywords 320. In some embodiments, other user interface components can be used to display same and allow for similar user engagement and data input. If a user is not signed in or has not activated a subscription, a message asking the user to sign in or check their license will be displayed on sidebar 310 with a button to return to settings 330. If the search engine optimization system at score generator has not completed calculating webpage score values, a message stating that the process is not complete will be displayed on sidebar 310 with a refresh button 340 to allow the user to reload the sidebar 310. In some embodiments, the sidebar 310 auto-refreshes.

According to an embodiment as shown in FIGS. 8 to 17, a user may sort and add keywords from a pop-up box 400. Pop-up box 400 comprises a list of keywords 460 which may be selected by a user to add 450 to their content. A user may select all keywords 440, top 40 keywords 445, top 20 keywords 455, or top 10 keywords 465 to add 450. At the top of pop-up box 400, a user may select a date 410 from a drop-down menu to filter content in list of keywords 460. Keywords may be queried by words 420 or by adding query 430 for questions 490 or longtail 500. Results may be sorted in ascending order 520 or descending order 530 alphabetically or filtered by criteria 540. Filter criteria 540 is selected from drop-down menu 570 and is the condition is entered into text box 550. Keywords will be filtered after a user selects ok 560.

Figure 18:
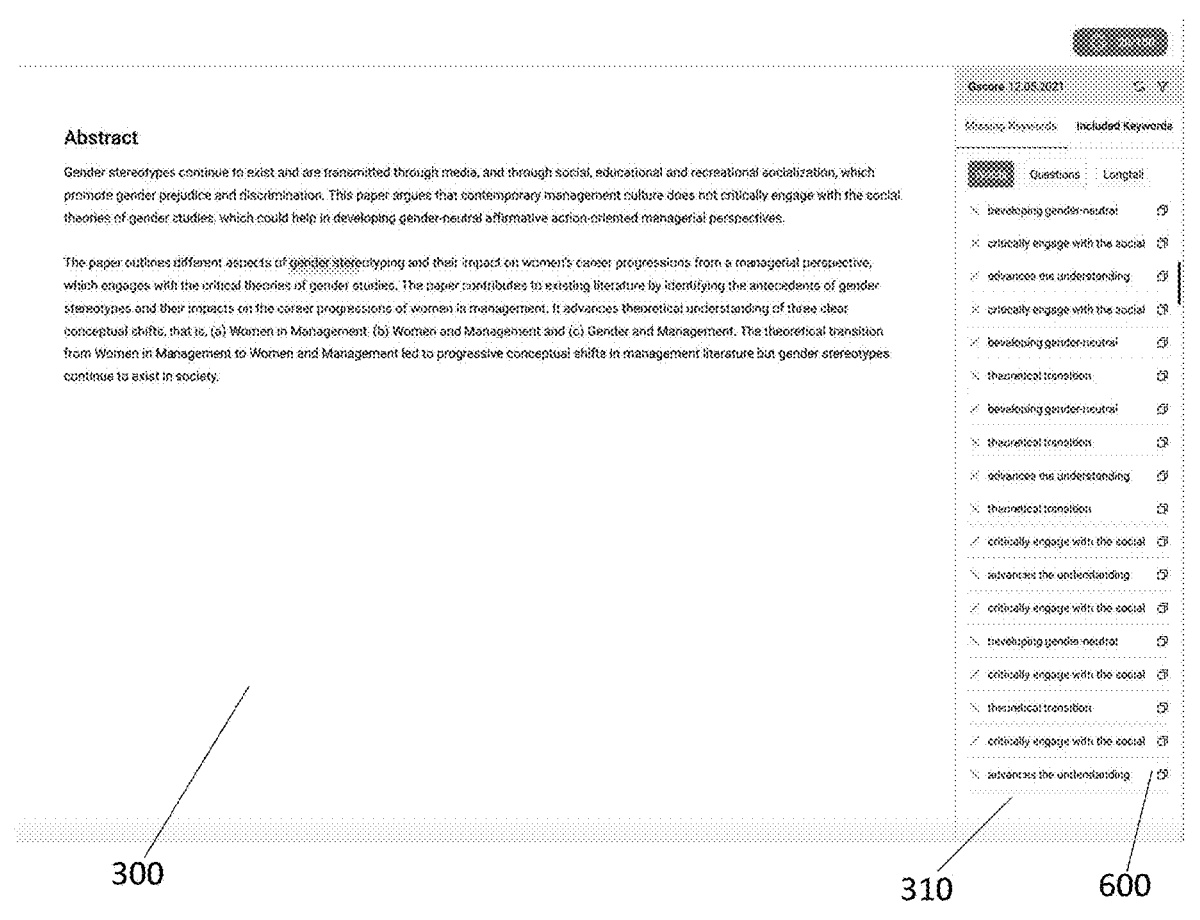
Figure 19:
FIG. 19 is a screenshot of a search engine optimization system showing webpage content with a sidebar listing keywords missing from the content, according to some embodiments.

According to an embodiment as shown in FIGS. 18 and 19, a signed-in user views missing keywords 600 and included keywords 610 in sidebar 310 for their webpage 300. Such interface components are generated by display generator of search engine optimization system, and such generation can be based on output from score generator.

Figure 20:
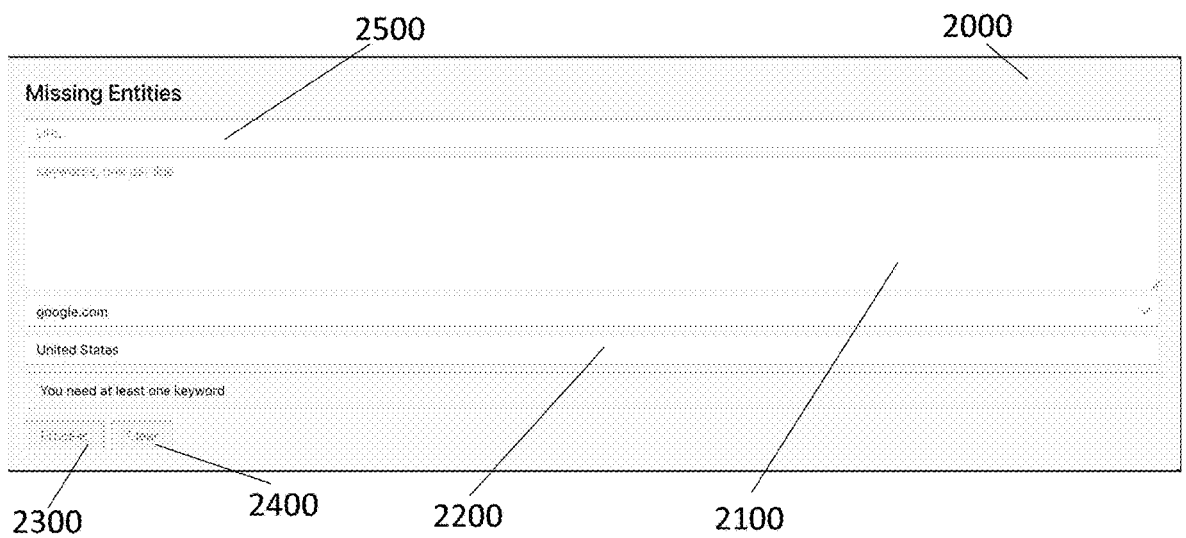
FIG. 20 is a screenshot of a search engine optimization system showing a form to generate related entities to a keyword, according to some embodiments.

According to an embodiment as shown in FIG. 20, the search engine optimization system is configured to generate related entities for a keyword. A user accesses form 2000 and enters in the URL 2500, keyword 2100, and country 2200. If the user entered in an incorrect value, they may clear form 2000 by selecting clear button 2400. To generate related entities to keyword 2100 for a URL 2500 in country 2200, process 2300 will be selected. Results are generated through the connection to an API, such as SERP API, that scrapes search results for keyword(s) 2100. The text from the search results, including links from the Google search engine results page and the meta descriptions, is copied. The copied data is processed as text through the Google Natural Language API. The application may only copy the dynamic blue links and meta description. Dynamic meta data is meta data shown by Google, as distinct from the meta data provided by the website. The application visits the webpage and downloads the meta data. The downloaded data is then compared to the data presented in search engine results. The difference in data will be processed by the Google Natural Language API. The natural language processing entities are saved in the application to be used as suggested keywords for optimizing content.

Figure 21:
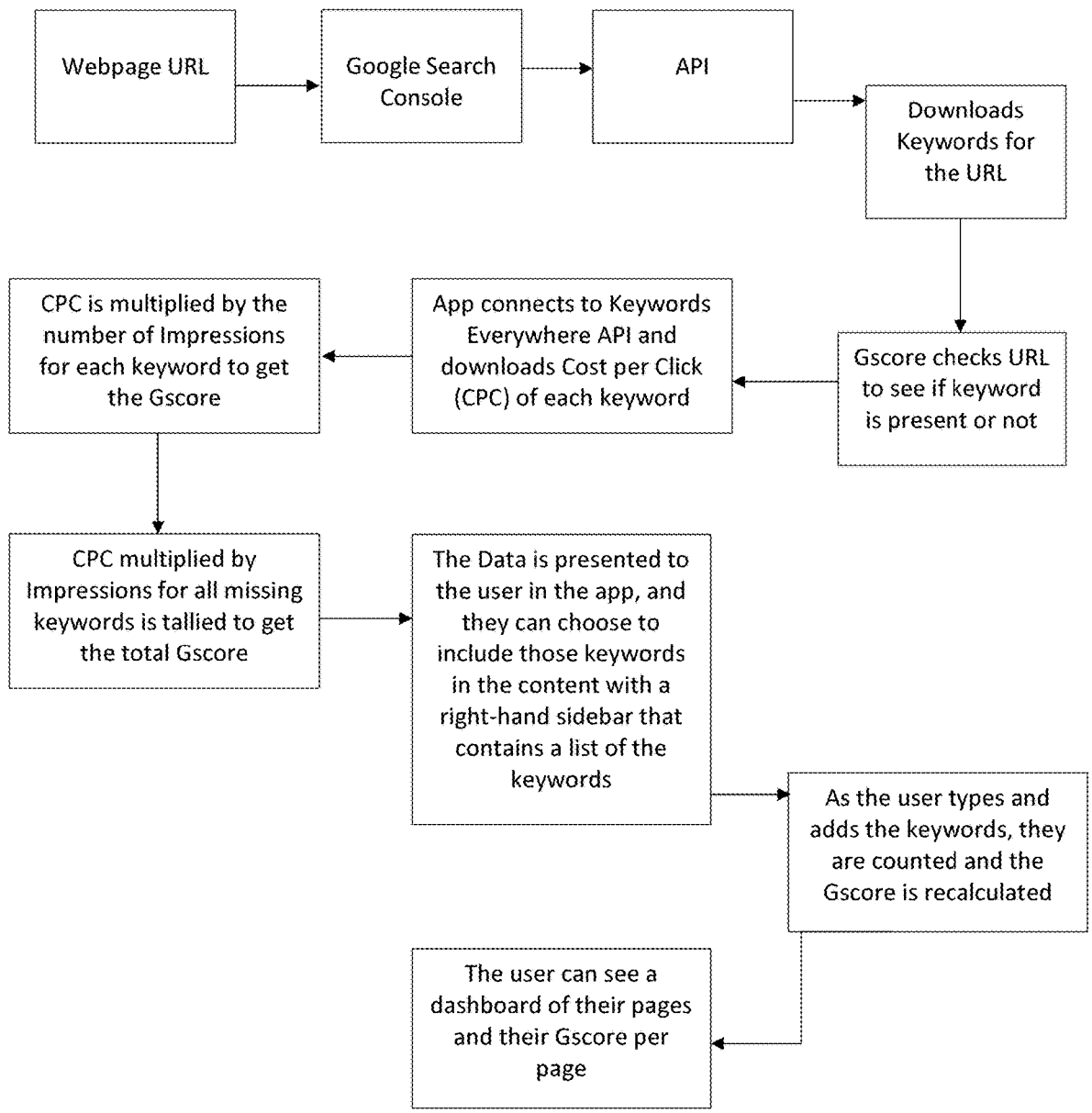
FIG. 21 is a flow diagram of steps for search engine optimization, according to some embodiments.
Figure 22:
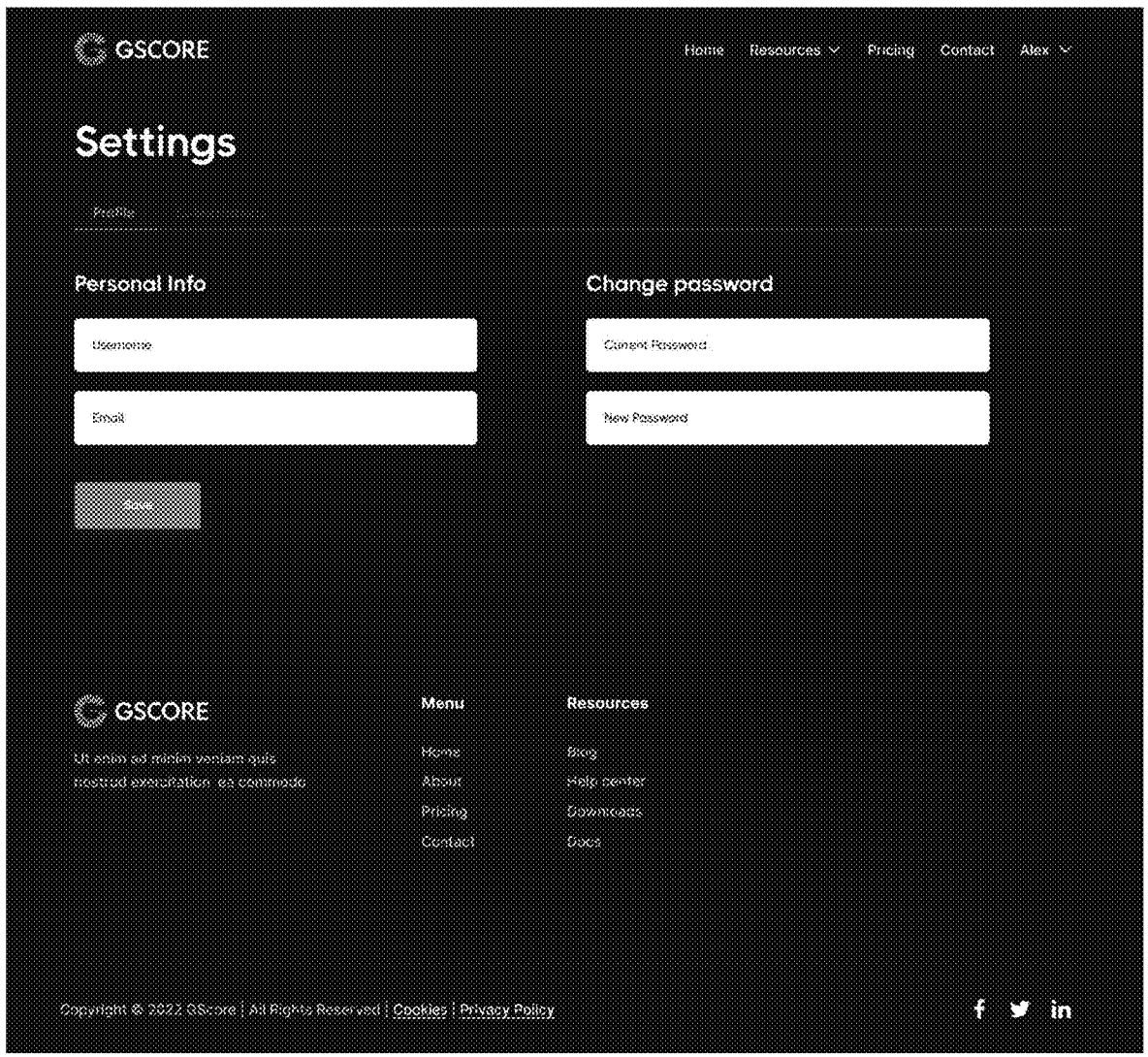
FIG. 22 is a screenshot of an application, according to some embodiments.
Figure 23:
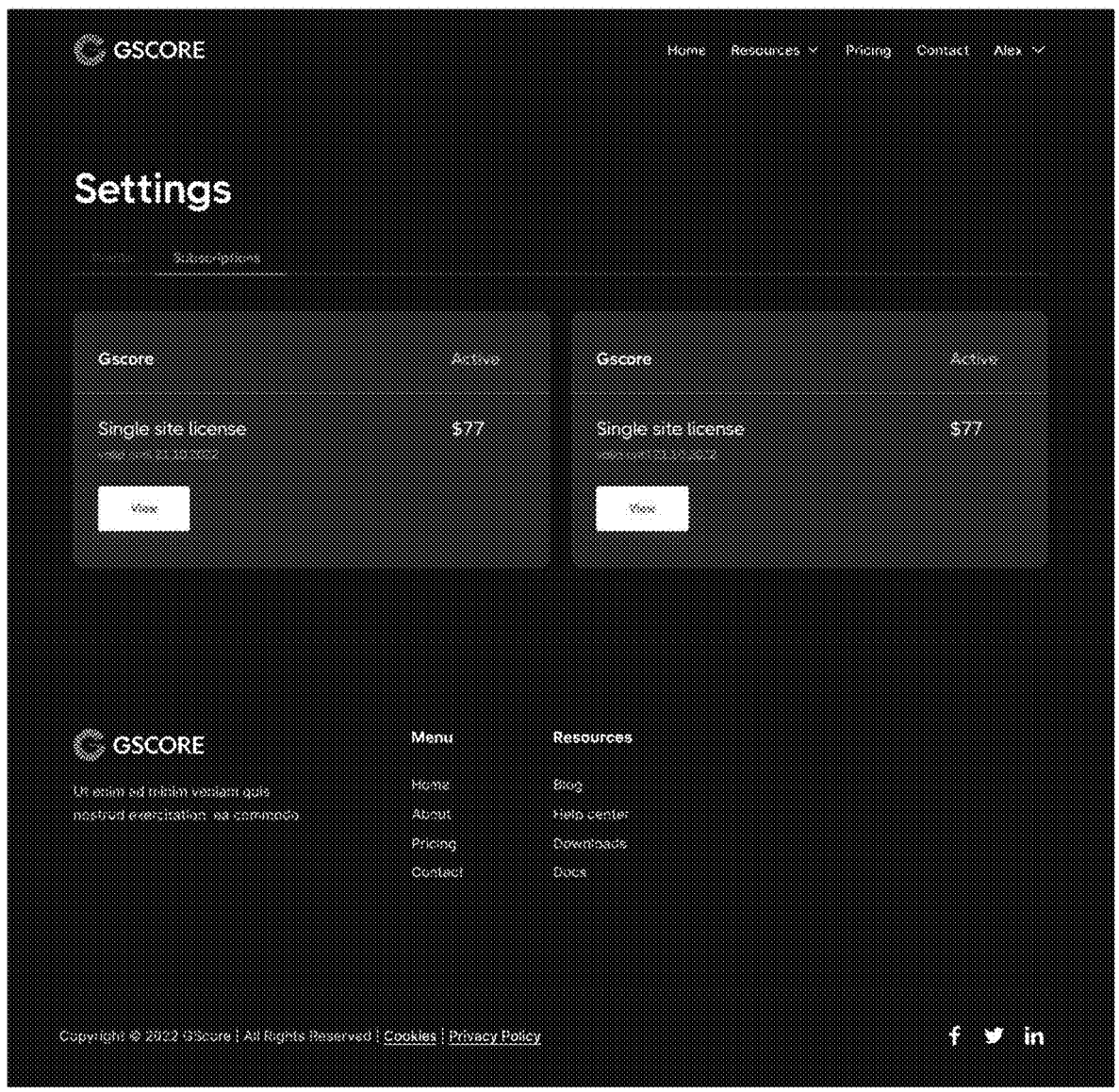
FIG. 23 is a screenshot of an application, according to some embodiments.
Figure 24:
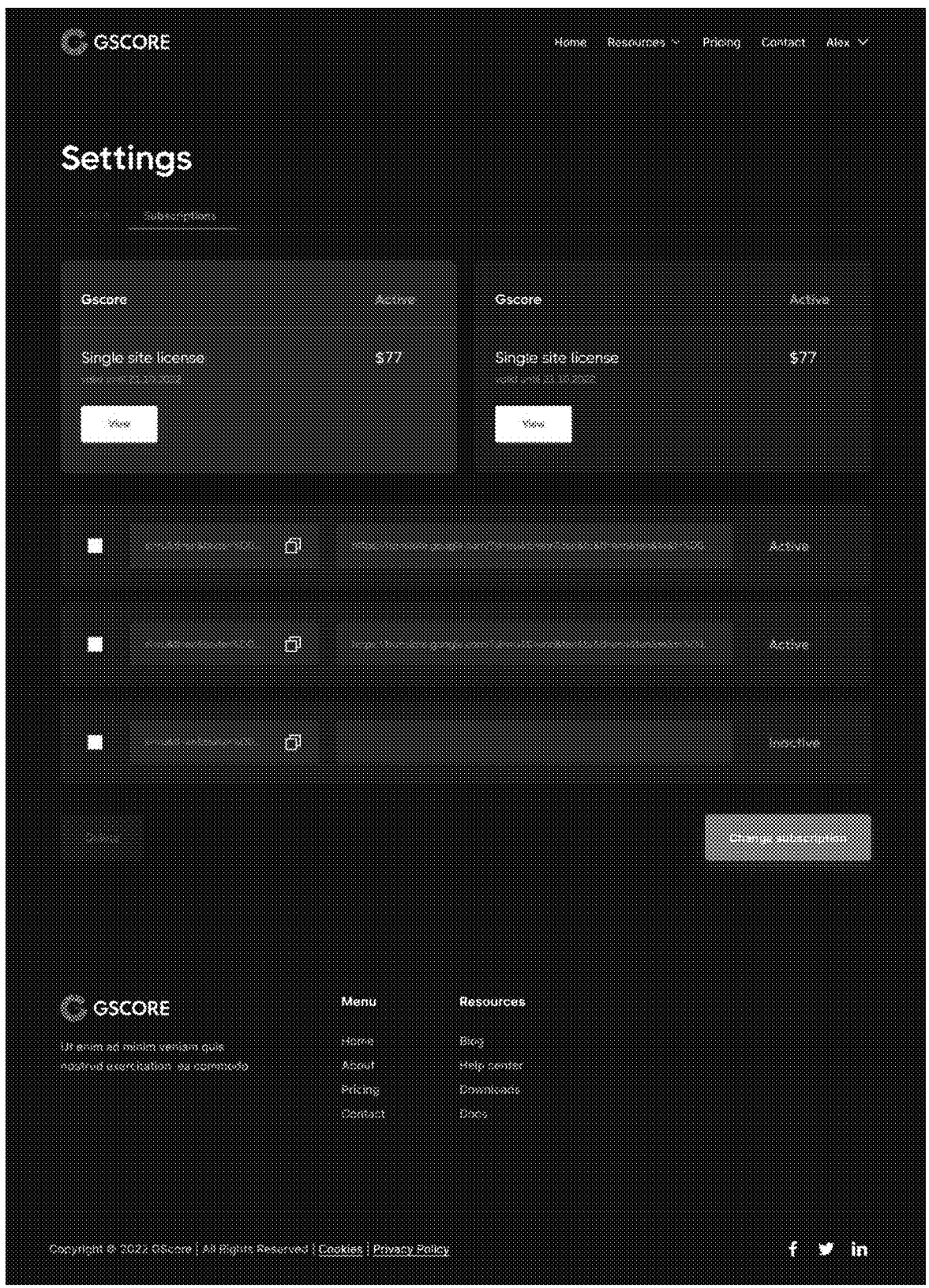
FIG. 24 is a screenshot of an application, according to some embodiments.
Figure 25:
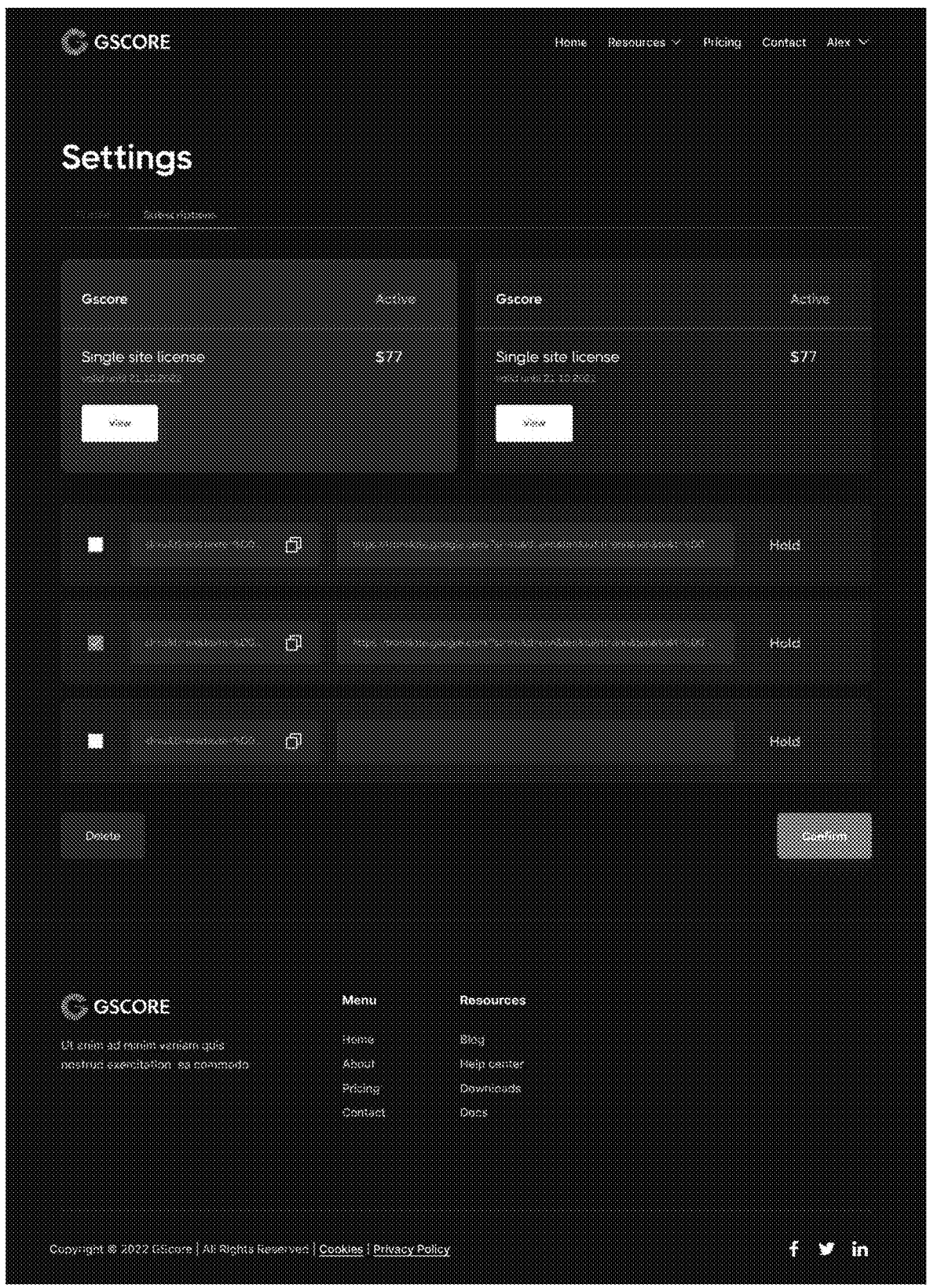
FIG. 25 is a screenshot of an application, according to some embodiments.
Figure 26:
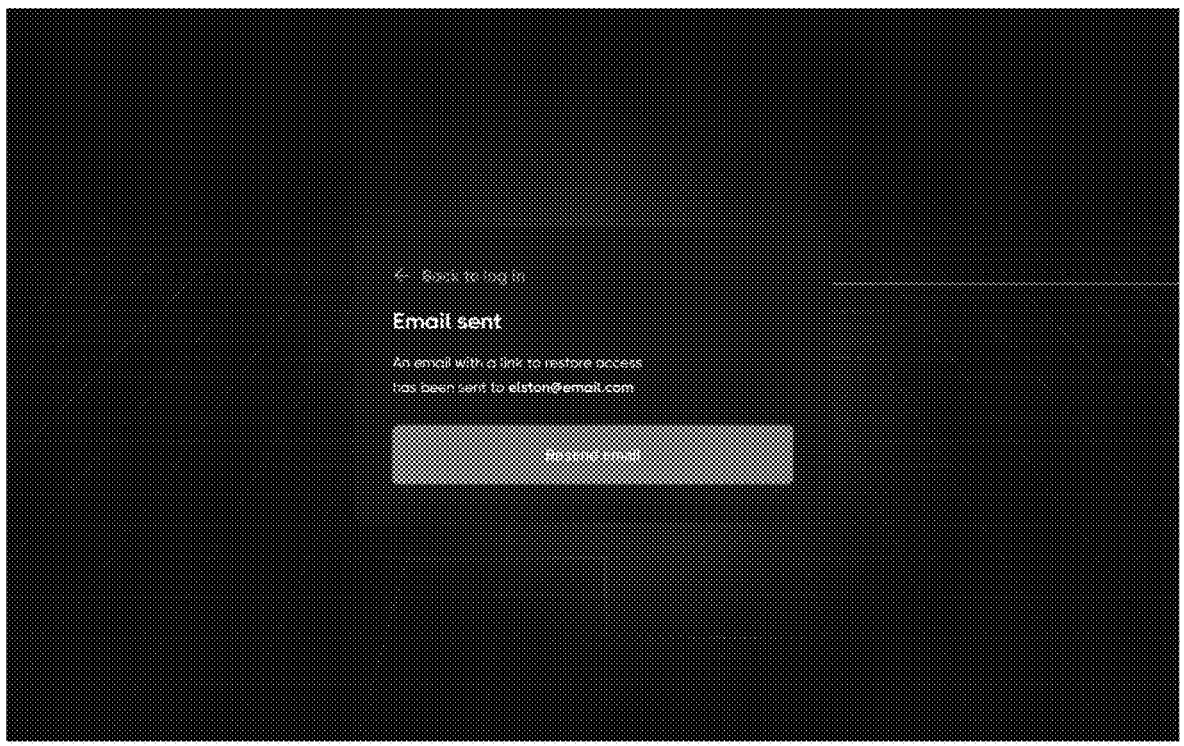
FIG. 26 is a screenshot of an application, according to some embodiments.
Figure 27:
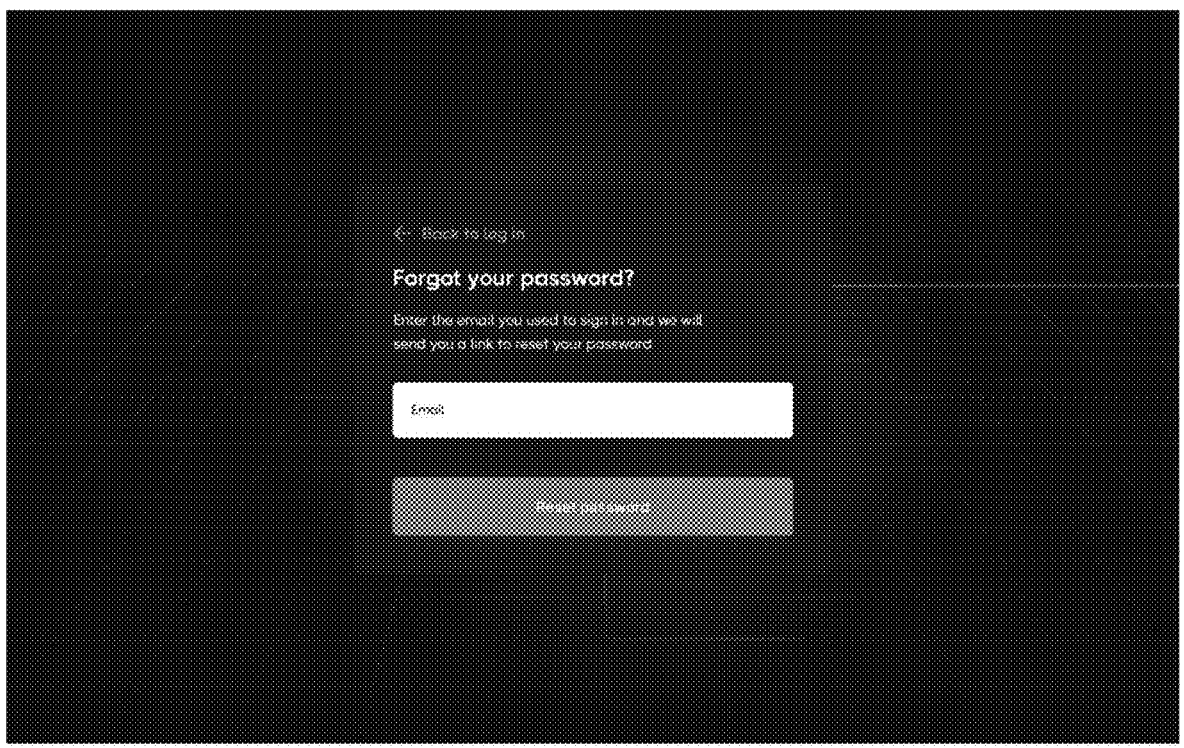
FIG. 27 is a screenshot of an application, according to some embodiments.
Figure 28:
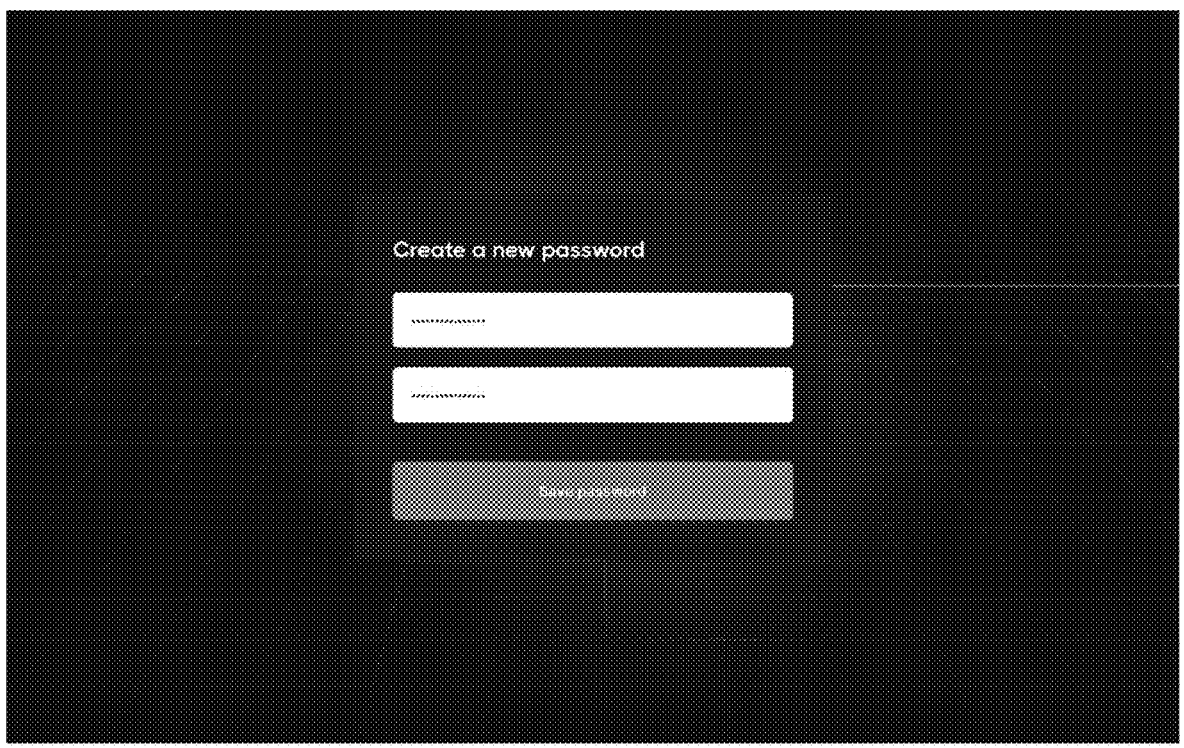
FIG. 28 is a screenshot of an application, according to some embodiments.
Figure 29:
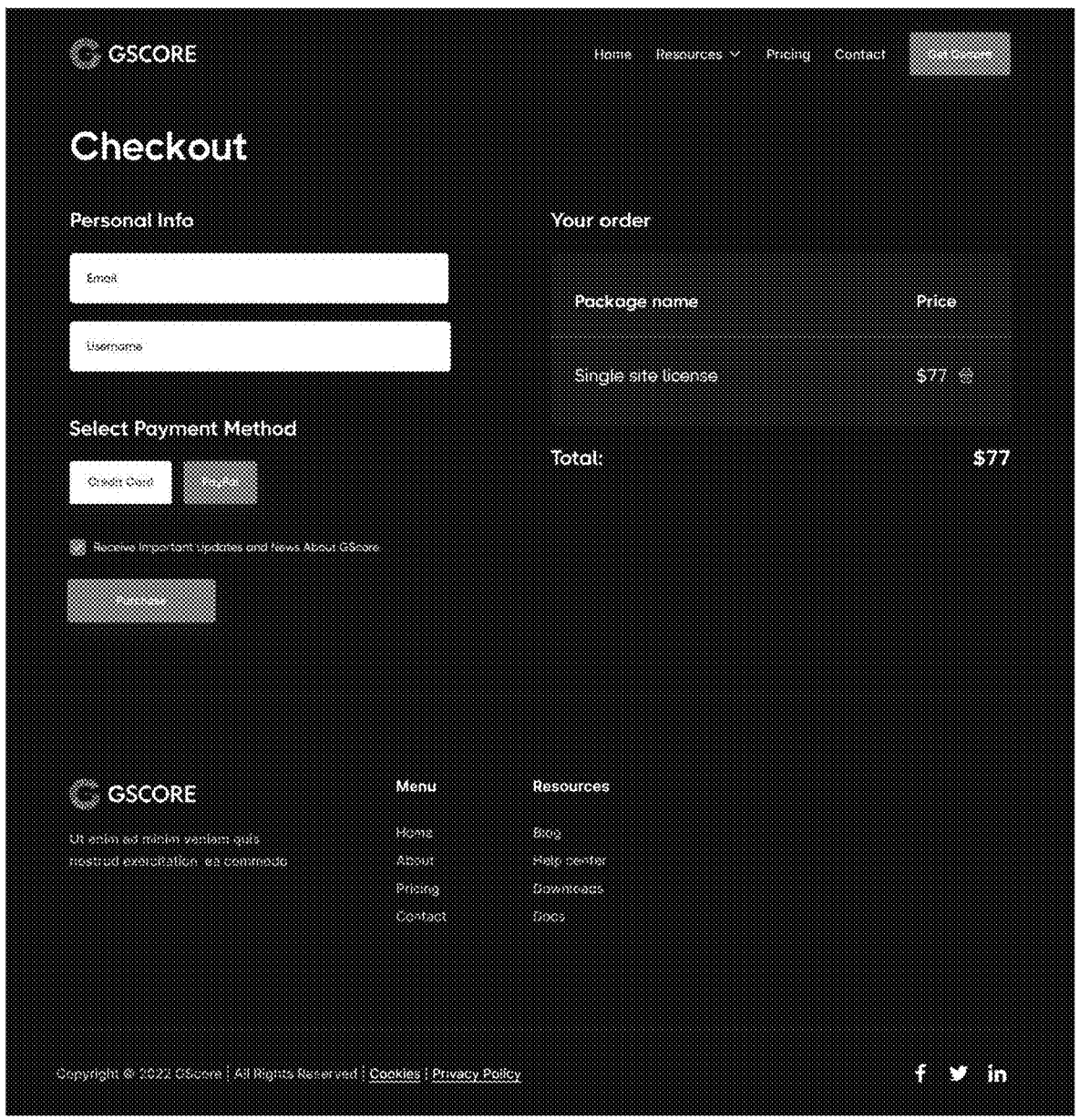
FIG. 29 is a screenshot of an application, according to some embodiments.
Figure 31:
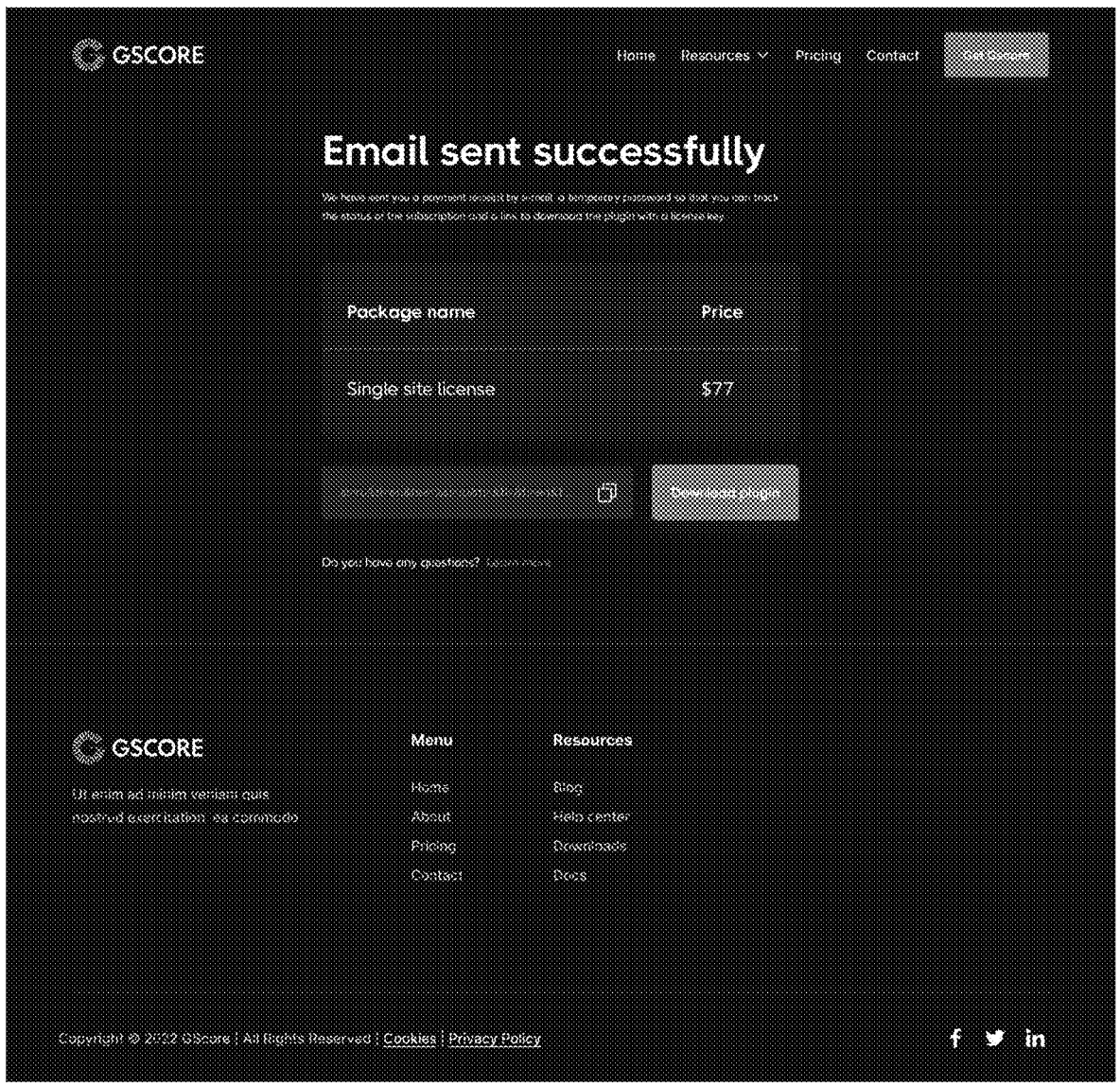
FIG. 31 is a screenshot of an application, according to some embodiments.
Figure 32:
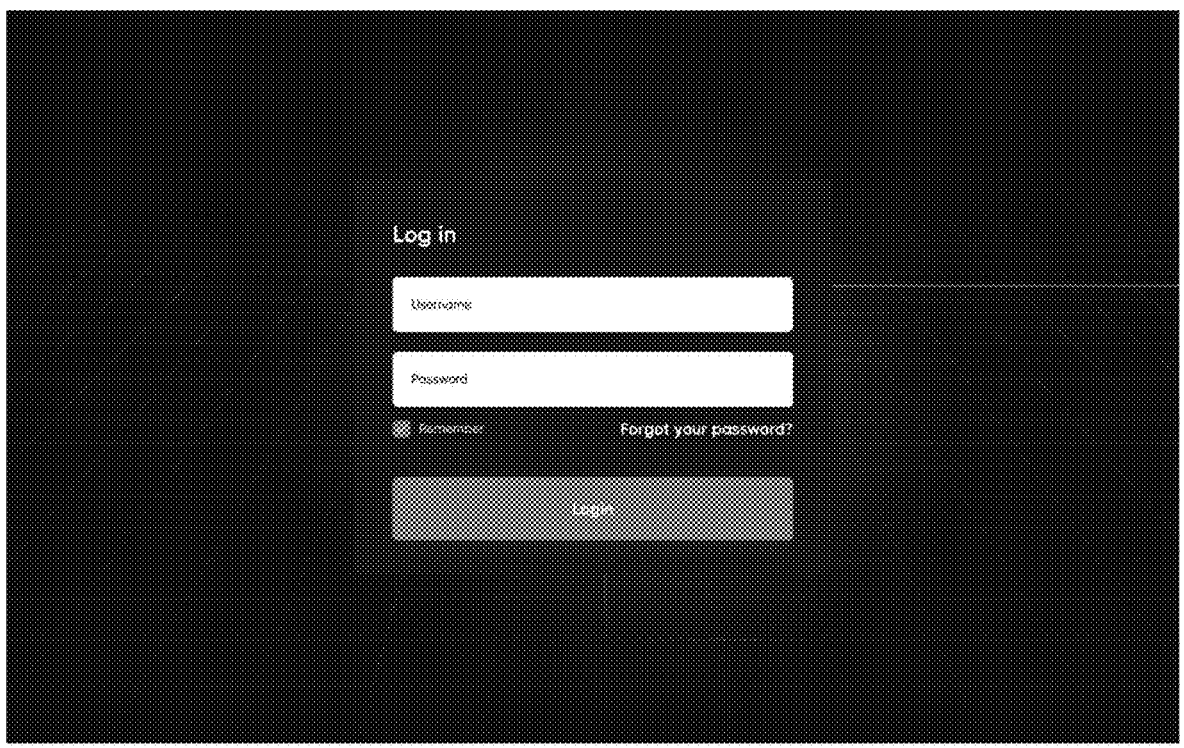
FIG. 32 is a screenshot of an application, according to some embodiments.

According to an embodiment as shown in FIG. 21, there is a flow chart showing the individual steps involved in optimizing a webpage's search engine result by calculating a webpage score for the webpage and how the steps interrelate with one another.

In some embodiments, search engine optimization system is configured to provides the ability to automate various processes as well as increase efficiency. The application can be a plugin or Chrome extension, such as a plugin for WordPress. Search engine optimization system can be implemented as a standalone web application and/or standalone software as a service product. In some embodiments, search engine optimizer is configured to generate a report showing any one or more outputs of search engine optimizer, such as each missing keyword determined for each webpage. For example, this can be configured in a spreadsheet format with or without content from each corresponding webpage. In some embodiments, search engine optimizer and/or one or more components of same are implemented as a script to generate the report. In some embodiments, data in Google Search Console is retrieved and can be used to include new content for a webpage. For example, new keywords can be presented to a user, and the new keywords can be used to improve the webpage. According to an embodiment, the application generates and displays keyword(s) used to rank a webpage and determines whether those keyword(s) are present on the webpage. In some embodiments, the application connects to the Keywords Everywhere API or otherwise determines the cost per click of the keyword(s). The application then generates the impression count (e.g., from Google Search Console, being the number of times the keyword was shown in search results) for each keyword and multiplies that impression count by the cost per click of the keyword. The total cost per click multiplied by the impression count for each of the keywords is generated as the webpage score for the webpage. Search engine optimization system is configured to present all the keywords and the webpage score (e.g., presented inside a WordPress content editor where the application is a WordPress plugin; or, alternatively, in a standalone web application) and these can be added to the content for the webpage. In some embodiments, if the application includes the functionality to generate related entities for a keyword, the natural language processing entities, where applicable, are presented as keywords. Where these keyword(s) are added to the content for the webpage, the webpage may accordingly be typically ranked higher in search engine results when users search for content using those keywords.

In an embodiment, keyword(s) presented or ranked include longtail and/or question-based keywords. This can allow optimization of the webpage for search engine results based on same.

FIGS. 22 to 32 show various screenshots of an example application implementing an example search engine optimization system, according to embodiments.

In some embodiments, search engine optimization system includes a processor configured to execute instructions in non-transitory memory to configure in non-transitory memory, various components of search engine optimization system, including account manager, score generator, search data generator, natural language generator, display generator, and/or content updater. Search engine optimization system is configured to determine at least one keyword for which a webpage is ranked by a search engine; determine if at least one missing keyword exists by comparing the at least one keyword to content of the webpage; determine a webpage score based on a cost per click of each missing keyword and an impression count for each missing keyword; and either or both: displaying at least one user interface component; or updating the content of the webpage based on at least one missing keyword. The at least one user interface component represents: the webpage score; or the webpage score and, if at least one missing keyword exists, at least one missing keyword, according to some embodiments.

In some embodiments, search engine optimization system at a score generator is configured to determine at least one keyword for which a webpage is ranked by a search engine by requesting and/or receiving data from/using Google Search Console API or other application. In some embodiments, search engine optimization system at a score generator is configured to retrieve the at least one keyword by connecting to a search engine and requesting a search using the webpage (e.g., the webpage's URL).

In some embodiments, the webpage is ranked above a threshold. For example, the at least one keyword(s) for which a webpage is ranked as determined by search engine optimization system can be those keyword(s) have a use or popularity or other attribute above a pre-defined level. As an example, such keyword(s) can be those that returns the webpage in the top 10 results in a search using those keyword(s).

In some embodiments, search engine optimization system at a score generator is configured to determine if at least one missing keyword exists by comparing the at least one keyword to content of the webpage. For example, the score generator can check whether one or more of the keywords for which the webpage is ranked is present on the webpage or is otherwise included in or associated with the webpage. Score generator can check those attributes (e.g., metadata and/or content in particular portions) of the webpage that a search engine indexes or evaluates in determining whether the webpage should be returned in response to a search query. If any of the keywords checked are not included in the content of the webpage, such keyword(s) can be determined to be missing keywords, and search engine optimization system can store data representing that determination (e.g., store a copy of each missing keyword in a data structure of missing keywords; store a flag representing that a keyword is determined to be missing, etc.).

In some embodiments, a keyword includes an entire string. In some embodiments, a keyword includes separate word(s) in a string. In some embodiments, a keyword includes stem portions of a word in a string. For example, in some embodiments, the at least one keyword(s) is each word in a search query string, and each word is compared with the content of the webpage and if one of the words searched is not included in the webpage content, the entire string that the keyword belonged to is determined to be a missing keyword. The entire string can be displayed using display generator in a user interface component as a missing keyword that can be added to the content of the webpage. As a further example, where a keyword is a stem portion of a term, each stem in the provided string is compared with the content of the webpage and if one of the stems (keywords) searched is not included in the webpage content, the entire string that the stem belonged to is determined to be a missing keyword.

For example, in some embodiments, instead of searching to see if a complete keyword string is a match, score generator is configured to divide the keyword string into separate words and search for matches at the individual word level. For example, a keyword can be "dogs eyes dilated and cloudy". While in some embodiments, score generator is configured to search the content for "dogs eyes dilated and cloudy" and if that exact string is not found, score generator would mark the keywords as unique or missing, in some embodiments, score generator is configured to separate the keyword "dogs eyes dilated and cloudy" into individual words, "dogs", "eyes", "dilated", and "cloudy" and searches each of those words in the content (stop words are ignored). Then, when one of those words is not found in the content, then the entire keyword string is marked as unique. In some embodiments, a keyword string can include only one term.

In some embodiments, score generator is configured to convert each word into a stem, and each stem is considered a keyword. This can be performed using Google Natural Language API or other API. Score generator is configured to use the stems in a comparison with the content. For example, score generator is configured to compare each stem derived from a keyword string with content from the webpage, according to some embodiments. In some embodiments, each word in the webpage content is also converted into a stem, and the stem(s) can be used for a comparison with the stem(s) derived from the keyword string.

For example, in some embodiments, the keyword dilated is converted into the stem "dilat." so if the content has the word "dialating," the stems would match and the keyword would not be considered as unique or missing.

In some embodiments, search engine optimization system at a score generator is configured to determine a webpage score based on a cost per click of each missing keyword and an impression count for each missing keyword. For example, in some embodiments, at a score generator is configured to determine the cost per click of each missing keyword by requesting and/or receiving data from/using Keywords Everywhere API or other application. In some embodiments, at a score generator is configured to determine the impression count for one or more missing keywords by determining the number of times that the keyword has been shown in search results using a search engine. For example, this can be by requesting and/or receiving the data from Google Search Console.

In some embodiments, the webpage score is a sum of, for each missing keyword, the cost per click multiplied by the impression count. For example, for one or more missing keywords, the cost per click is multiplied by the impression count, and the products are summed to determine the webpage score. In various embodiments, score generator is configured to select one or more keywords and/or missing keywords on which the method is performed. In various embodiments, score generator is configured to perform the method on all keywords and missing keywords determined, as applicable.

In some embodiments, search engine optimization system includes a display generator configured by the processor. According to some embodiments, the display generator is configured to generate user interface components and present same, such as at a computer display using audio and/or visual output devices. In some embodiments, at least one user interface component representing one or more or all missing keywords is generated by the display generator. For example, this can be shown in a sidebar or menu positioned at a location on the display. A user can interact with the user interface to select one or more or all of the missing keywords and request that same is added to the webpage content of a selected webpage. One or more webpages can be selected by the user by engaging with a user interface component (e.g., button, menu, bar, etc.). In some embodiments, the display generator is configured to generate these user interface components within a plug-in application, such as a WordPress plug-in embedded with a WordPress content editor, for example. In some embodiments, the display generator is configured to generate these user interface components within a standalone computer application. Various user interface component configurations can be implemented. FIGS. 1 to 32 show various example user interface components.

In some embodiments, the at least one user interface component represents: the webpage score; or the webpage score and, if at least one missing keyword exists, at least one missing keyword, according to some embodiments. The at least one user interface component(s) can be included within a user interface component representing a dashboard interface component. The dashboard interface component can show at least one webpage and each webpage score for each webpage. Such webpages can be those that are associated with and/or owned by a user whose account the dashboard interface component is associated with, for example. In some embodiments, search engine optimization system includes an account manager, which is configured to provide login, authentication, and security permissions functionality. This can allow a user to login and request viewing the dashboard interface component showing each webpage and each associated webpage score and each associated missing keyword(s), for example. Such components can be selectively viewed upon receipt of a request by display generator to view same, for example. A user can provide user input (e.g., clicks) selecting each missing keyword that the user would like to add to the content for a particular webpage, and search engine optimization system is configured to receive the user input and configure the webpage (e.g., via providing input to a content editor) to include the selected keyword(s), according to some embodiments. Each user interface component is generated by a display generator included with search engine optimization system and configured by the processor.

Figure 13:
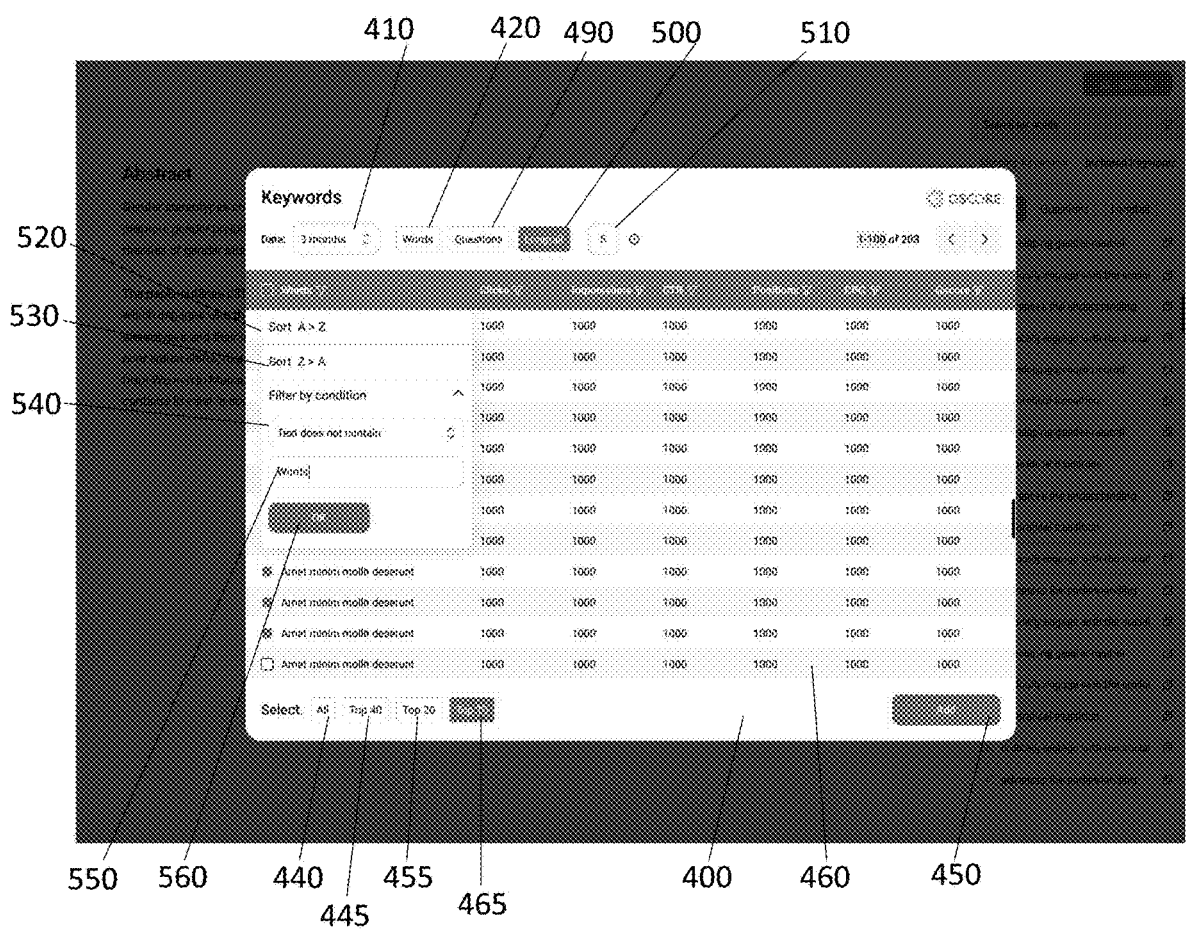
FIG. 13 is a screenshot of a search engine optimization system showing a drop-down menu for sorting keywords, according to some embodiments.
Figure 14:
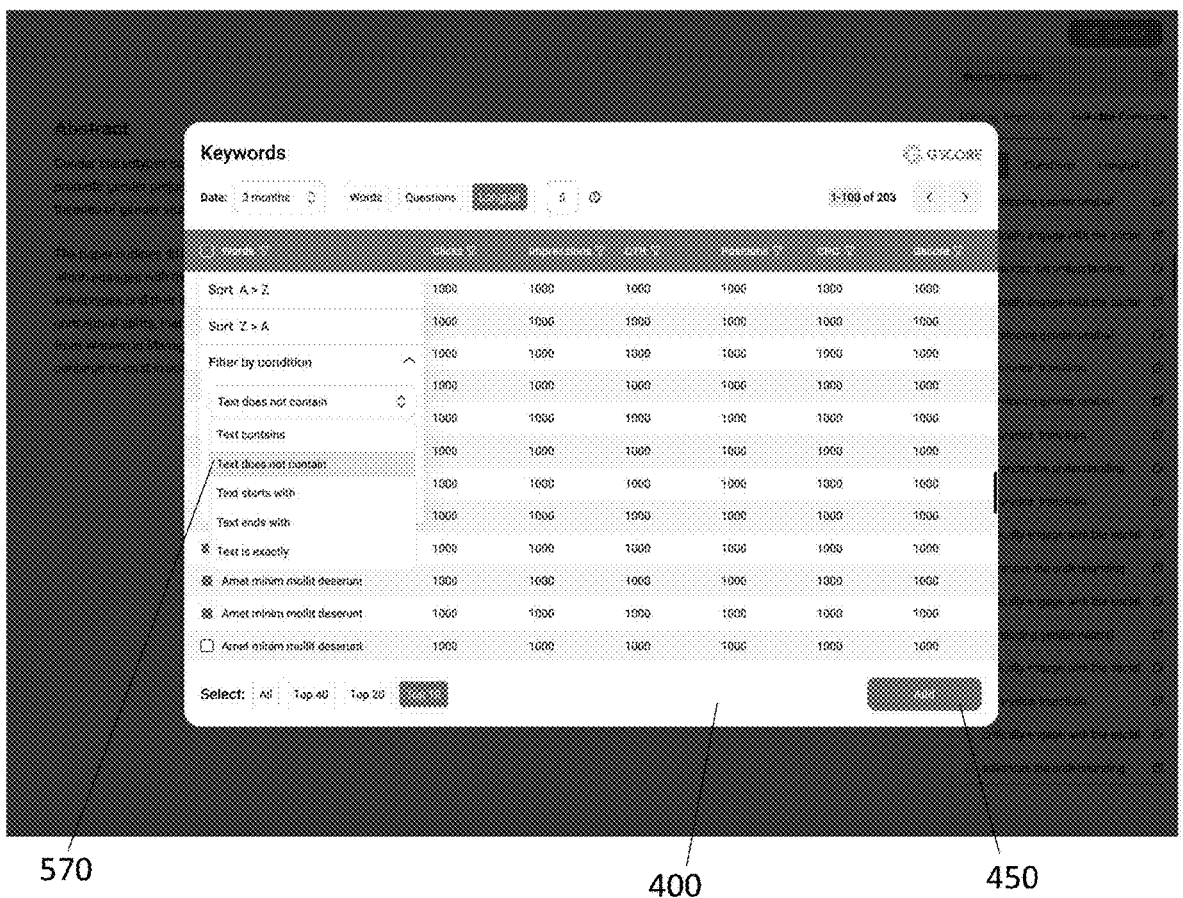
FIG. 14 is a screenshot of a search engine optimization system showing a drop-down menu for filter conditions for keywords, according to some embodiments.
Figure 15:
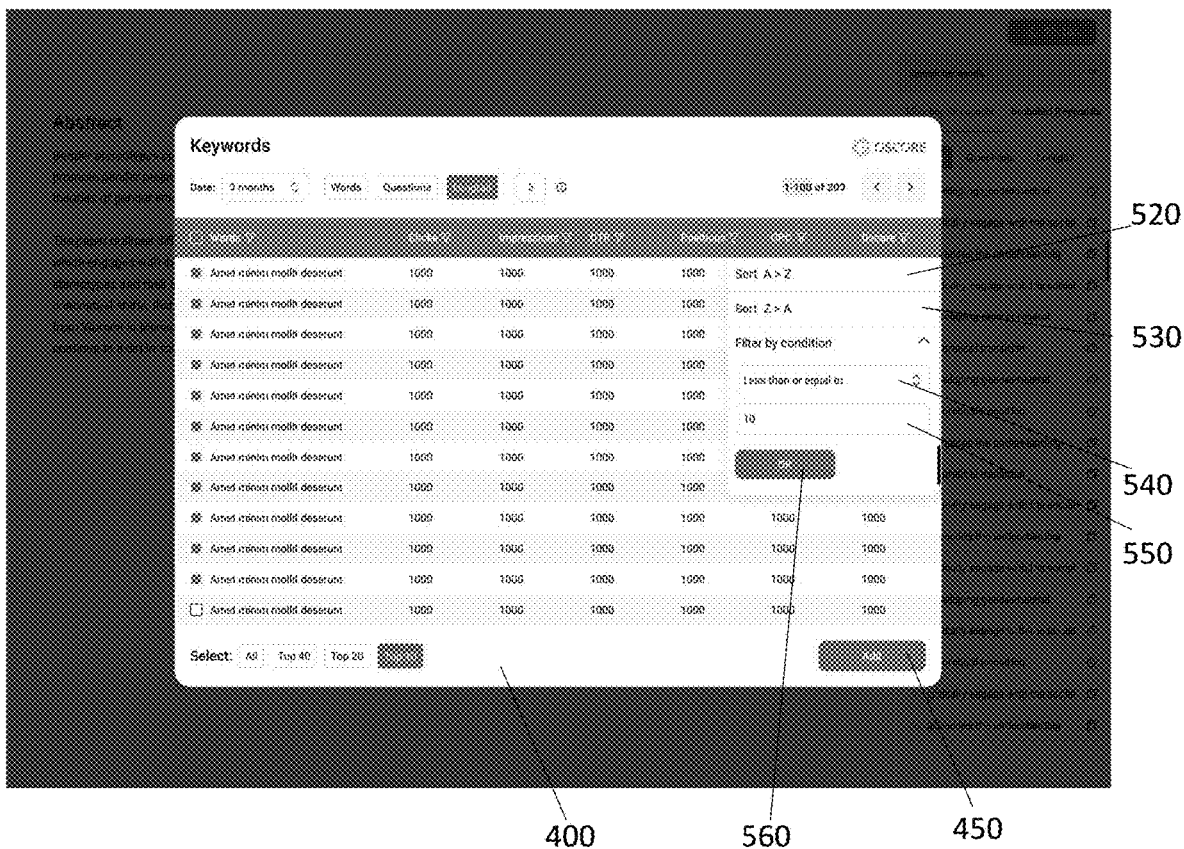
FIG. 15 is a screenshot of a search engine optimization system showing a drop-down menu for sorting keyword results by webpage score value, according to some embodiments.
Figure 16:
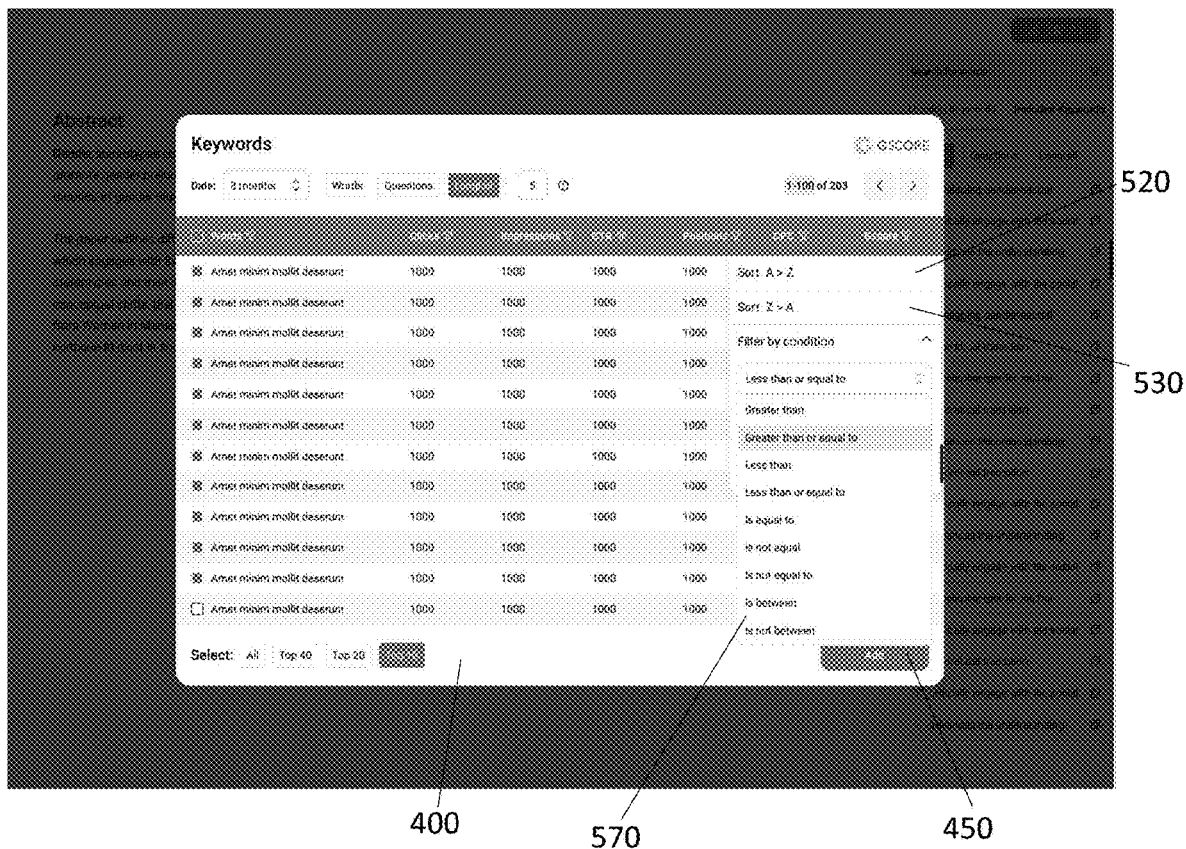
FIG. 16 is a screenshot of a search engine optimization system showing a drop-down menu for filter conditions for sorting by webpage score value, according to some embodiments.
Figure 17:
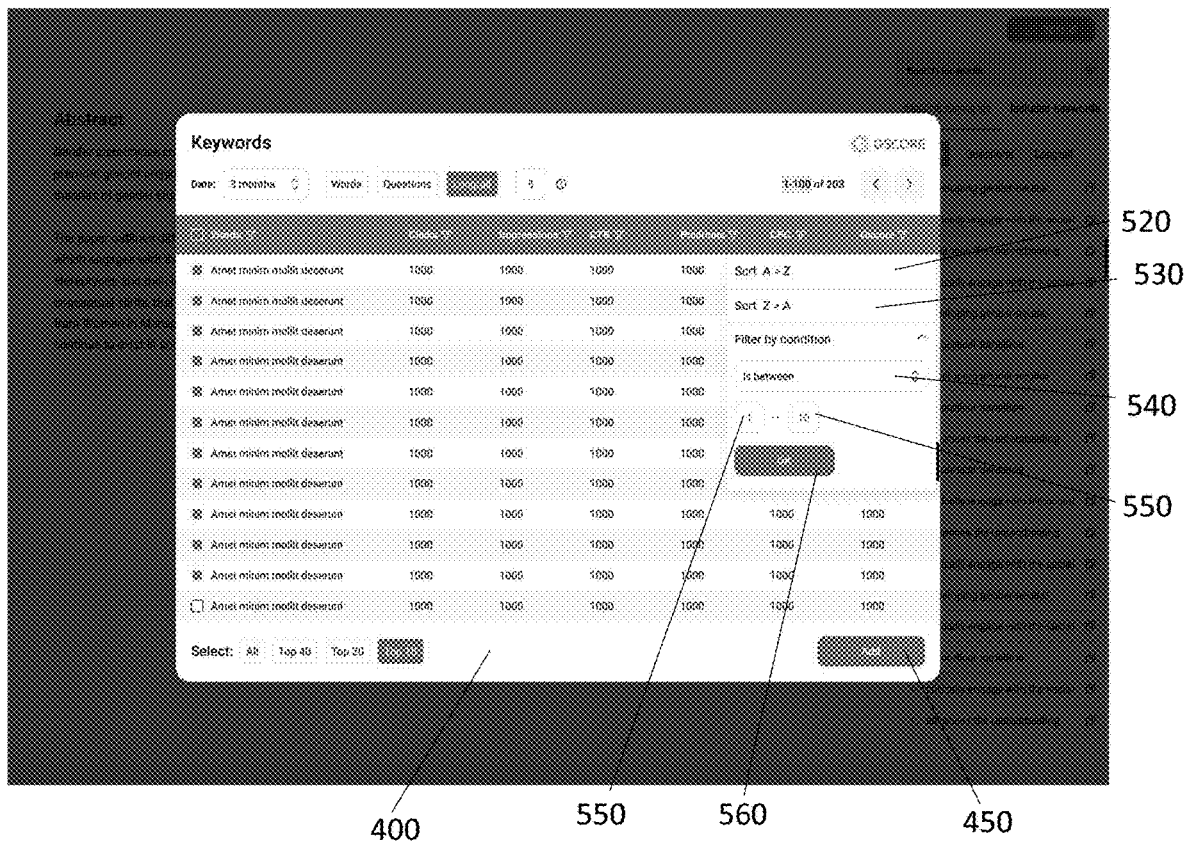
FIG. 17 is a screenshot of a search engine optimization system showing a drop-down menu for filtering webpage score value results between a range of two numerical values, according to some embodiments.

In some embodiments, missing keyword(s) can be sorted, filtered, and/or searched via engagement at the display with respective user interface components. For example, only the top keywords (e.g., above a pre-determined or specified threshold level) can be shown. As another example, a user can filter by condition, such as to exclude keywords containing text specified by the user, such as shown in FIG. 13. In some embodiments, keywords can also be sorted, filtered, and/or searched by various other attributes including clicks, impressions, position, cost per click, webpage score, words, and/or date, for example.

In some embodiments, search engine optimization system at a content updater is configured to update the content of the webpage (or multiple selected webpages) based on one or more or all missing keywords determined. In some embodiments, content updater is configured to do so without displaying any user interface components showing the webpage score or the missing keyword(s). In some embodiments, a content updater is configured to do so as well as displaying such user interface component(s). For example, in some embodiments, upon determining one or more missing keyword(s), a content updater is configured to automatically configure the webpage content to include the missing keyword(s), without requiring user input or selection. In some embodiments, updating the content of the webpage includes generating new content or data based on one or more of the missing keyword(s) and configuring the webpage to include the new content. In some embodiments, updating the content of the webpage includes adding at least one missing keyword to the content of the webpage. In some embodiments, a content updater is not included in search engine optimization system.

In some embodiments, the method further comprises receiving an update to the content of the webpage; updating the webpage score based on the update; and displaying at least one user interface component representing the webpage score. For example, a user can engage with the search engine optimization system and provide user input representing a request to add additional keyword(s) to the content of one or more webpages. Search engine optimization system is configured to update the content of the webpage to add the additional new keyword(s) and/or receive the updated content of the webpage, according to some embodiments. In some embodiments, search engine optimization system is configured to update the webpage score based on the update.

This can be done by a similar method as outlined herein by determining the webpage score based on the keyword(s) presently included in the content of the webpage after the update. For example, search engine optimization system can newly determine at least one keyword for which the updated webpage is ranked by a search engine; determine if at least one missing keyword exists by comparing the at least one keyword to content of the webpage; determine a new webpage score based on a cost per click of each missing keyword and an impression count for each missing keyword.

In some embodiments, the webpage score is updated based on the cost per click of each missing keyword and the impression count for each missing keyword, except of any included keyword included in the content after the update. In some embodiments, search engine optimization system can instead only determine the cost per click and impression count for the updated portion of the content (e.g., for only new keyword(s) added in the update) and update the website score based on same, such as by subtracting same from the website score.

In some embodiments, the method further includes: receiving at least one proposed keyword; receiving search result data retrieved based on the at least one proposed keyword; generating at least one natural language processing entity based on the search result data; and displaying a suggestions user interface component representing the at least one natural language processing entity as at least one suggested keyword.

For example, in some embodiments, search engine optimization system is configured to receive at least one proposed keyword as data input from a user, such as engaged at a user device providing access to search engine optimization system. As another example, in some embodiments, search engine optimization system is configured to retrieve at least one proposed keyword based on keyword(s) suggested or included in association with a webpage, such as a webpage managed in association with a user account or a webpage identified by a user.

As an example, in some embodiments, search engine optimization system at a search data generator is configured to receive search result data based on the at least one proposed keyword by transmitting a request to a search engine to provide search result data located by running a query for the at least one proposed keyword. As another example, in some embodiments, search engine optimization system at a search data generator is configured to retrieve and process search result data returned from a query based on the at least one proposed keyword. In some embodiments, this is by connecting to an external server that returns search result data based on one or more proposed keyword. In some embodiments, search engine optimization system at the search data generator selects after retrieving and/or, in some embodiments, only retrieves select data as the search result data.

In some embodiments, this search result data selected is dynamic metadata and reference(s) to the result (e.g., webpage URL; link; also referred to as result reference(s)), which are returnable by the search engine based on the at least one proposed keyword. This can be selected for each result returned (or returnable). In some embodiments, the method further comprises determining a metadata difference by comparing dynamic metadata to webpage metadata, the search result data comprising the metadata difference. For example, in some embodiments, search engine optimization system at the search data generator is configured to determine the difference (also referred to as metadata difference) between dynamic metadata and result metadata for one or more or all particular search engine result(s). This can be by comparing the dynamic metadata to the result metadata for each search engine result, for example. The metadata difference can be data (e.g., expressions or terms) appearing in the dynamic metadata but not in the result metadata, for example. The difference can be used by search engine optimization system as input to a natural language determination unit configured to determine one or more natural language processing entities (NPLs) based on same, such as in conjunction with other data. In some embodiments, this search result data selected is result metadata and reference(s) to the result, which are returnable by the search engine based on the at least one proposed keyword.

In some embodiments, the search result data (such as after processing and/or selection) is received by search engine optimization system at the search data generator, and search engine optimization system at the search data generator is configured to provide the search result data as input to a natural language determination unit. Natural language generator can be included with search engine optimization system. Natural language generator can be located on an external server. Natural language generator is configured to generate at least one NLP entity based on the search result data. For example, natural language determination unit can receive data generated based on a difference between dynamic metadata and result metadata, as well as a reference to a search result and generate one or more NLP entities reflecting the context and/or terms used in same. Other data can be used in generating one or more NLP entities, such as search result data relating to (e.g., derived from) other results returned (or returnable) by a search engine in response to a query using the at least one proposed keyword, according to some embodiments.

In some embodiments, a proposed keyword can be a stem of a word. In some embodiments, a term received can be a stem of a word, and search data generator is configured to generate one or more words based on the stem and use the one or more generated words as one or more proposed keywords. Search data generator is configured to use such one or more proposed keywords to retrieve the search result data such as described, according to some embodiments.

In some embodiments, search engine optimization system at a display generator is configured to display a suggestions user interface component representing the at least one natural language processing entity as at least one suggested keyword. For example, the suggestions user interface component can be a drop down list, pop-up, menu, text, graphic, or other component displaying one or more NLPs generated by natural language generator. Each NLP can be generated by natural language generator in association with one or more particular proposed keyword(s) and/or one or more particular webpage(s), such as a webpage managed through a particular user account.

In some embodiments, search engine optimization system implements an application which is a standalone application. In some embodiments, search engine optimization system implements an application which is a website plugin, such as operable with a website content editor, an example of which is WordPress.

An example embodiment will now be described. In some embodiments, search engine optimization system is configured to generate related entities for a keyword. In some embodiments, search engine optimization system connects to an API that scrapes search results for the given keywords. An example API can be found at https://dataforseo.com/apis/serp-api. Other APIs can be used. In some embodiments, search engine optimization system is configured to copy the text from the search results, mainly meta descriptions and the blue links from the Google search engine results page. Once this this data/text is copied, search engine optimization system is configured to process the text through the Google Natural Language API. Other APIs can be used.

In some embodiments, search engine optimization system is configured to only copy the dynamic blue links and meta descriptions from search engine results. Dynamic metadata is metadata that the search engine chooses to display or provide, while result metadata is metadata that is provided by the website returned in the search engine result, for example. In this case, search engine optimization system is configured to visit the website, download the result metadata and compare it to dynamic metadata or what is present on the search engine results page. Search engine optimization system is then configured to only process the information that is different in the Google Natural Language API or other API. The API is configured to generate NLP entities based on the data processed. These NLP entities are then stored by search engine optimization system and used as suggested keywords to help optimize the content.

In some embodiments, search data generator, natural language generator, and display generator operate as a standalone search engine optimization system, without score generator or content updater. For example, in some embodiments, search engine optimization system provides an application (e.g., standalone application and/or website plugin) that implements a computer-implemented method for search engine optimization, comprising: receiving at least one keyword; receiving search result data retrieved based on the at least one keyword; generating at least one natural language processing entity based on the search result data; and displaying a user interface component representing the at least one natural language processing entity as at least one suggested keyword.

Various embodiments have been described in detail. Changes in and/or additions to the description may be made, and the present application is not to be limited to those details.

What is claimed is:

1. A computer-implemented method for search engine optimization, comprising:
   determining at least one keyword for which a webpage is ranked by a search engine;
   determining if at least one missing keyword exists by comparing the at least one keyword to content of the webpage;
   determining a webpage score based on a cost per click of each missing keyword and an impression count for each missing keyword; and
   either or both:
       displaying at least one user interface component representing:
           the webpage score; or
           the webpage score and, if at least one missing keyword
           exists, at least one missing keyword; and
       updating the content of the webpage based on at least one missing keyword.

2. The computer-implemented method of claim 1, wherein the webpage is ranked above a threshold.

3. The computer-implemented method of claim 1, wherein the webpage score is a sum of, for each missing keyword, the cost per click multiplied by the impression count.

4. The computer-implemented method of claim 1, wherein the updating comprises adding at least one missing keyword to the content of the webpage.

5. The computer-implemented method of claim 1, further comprising receiving an update to the content of the webpage; updating the webpage score based on the update; and displaying at least one user interface component representing the webpage score.

6. The computer-implemented method of claim 5, the webpage score updated based on the cost per click of each missing keyword and the impression count for each missing keyword, except of any included keyword included in the content after the update.

7. The computer-implemented method of claim 1, further comprising displaying a dashboard interface component representing at least one webpage and each webpage score for each webpage.

8. The computer-implemented method of claim 1, further comprising:
   receiving at least one proposed keyword;
   receiving search result data retrieved based on the at least one proposed keyword;
   generating at least one natural language processing entity based on the search result data; and
   displaying a suggestions user interface component representing the at least one natural language processing entity as at least one suggested keyword.

9. A computer-implemented method for search engine optimization, comprising:
   receiving at least one keyword;
   receiving search result data retrieved based on the at least one keyword;
   generating at least one natural language processing entity based on the search result data; and
   displaying a user interface component representing the at least one natural language processing entity as at least one suggested keyword.

10. The computer-implemented method of claim 8, the search result data comprising result metadata and at least one result reference.

11. The computer-implemented method of claim 8, the search result data comprising dynamic metadata.

12. The computer-implemented method of claim 8, further comprising determining a metadata difference by comparing dynamic metadata to webpage metadata, the search result data comprising the metadata difference.

13. A non-transitory computer-readable medium storing computer-readable instructions which, when executed by a computer processor, cause the processor to perform a method comprising:
   determining at least one keyword for which a webpage is ranked by a search engine;
   determining if at least one missing keyword exists by comparing the at least one keyword to content of the webpage;
   determining a webpage score based on a cost per click of each missing keyword and an impression count for each missing keyword; and
   either or both:
       displaying at least one user interface component representing:
           the webpage score; or
           the webpage score and, if at least one missing keyword exists, at least one missing keyword; and
       updating the content of the webpage based on at least one missing keyword.

14. A non-transitory computer-readable medium of claim 13, wherein the webpage is ranked above a threshold.

15. A non-transitory computer-readable medium of claim 13, wherein the webpage score is a sum of, for each missing keyword, the cost per click multiplied by the impression count.

16. A non-transitory computer-readable medium of claim 13, wherein the updating comprises adding at least one missing keyword to the content of the webpage.

17. A non-transitory computer-readable medium of claim 13, the method further comprising receiving an update to the content of the webpage; updating the webpage score based on the update; and displaying at least one user interface component representing the webpage score.

18. The computer-implemented method of claim 17, the webpage score updated based on the cost per click of each missing keyword and the impression count for each missing keyword, except of any included keyword included in the content after the update.

19. A non-transitory computer-readable medium of claim 13, the method further comprising displaying a dashboard interface component representing at least one webpage and each webpage score for each webpage.

20. A non-transitory computer-readable medium of claim 13, the method further comprising:
receiving at least one proposed keyword;
receiving search result data retrieved based on the at least one proposed keyword;
generating at least one natural language processing entity based on the search result data; and
displaying a suggestions user interface component representing the at least one natural language processing entity as at least one suggested keyword.

* * * * *